United States Patent
Ryu et al.

(10) Patent No.: US 11,646,912 B2
(45) Date of Patent: May 9, 2023

(54) TECHNIQUES TO FACILITATE PHASE JUMP ESTIMATION FOR SIDELINK DMRS BUNDLING

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Tianyang Bai, Somerville, NJ (US); Xiaojie Wang, Hillsborough, NJ (US); Xiaoxia Zhang, San Diego, CA (US); Jing Sun, San Diego, CA (US); Peter Gaal, San Diego, CA (US); Juan Montojo, San Diego, CA (US); Piyush Gupta, Bridgewater, NJ (US); Wooseok Nam, San Diego, CA (US); Mahmoud Taherzadeh Boroujeni, San Diego, CA (US); Hua Wang, Basking Ridge, NJ (US); Lik Hang Silas Fong, Bridgewater, NJ (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/404,828

(22) Filed: Aug. 17, 2021

(65) Prior Publication Data
US 2023/0055114 A1 Feb. 23, 2023

(51) Int. Cl.
*H04L 25/02* (2006.01)
*H04W 52/52* (2009.01)
*H04W 52/54* (2009.01)

(52) U.S. Cl.
CPC ......... *H04L 25/0222* (2013.01); *H04W 52/52* (2013.01); *H04W 52/54* (2013.01)

(58) Field of Classification Search
CPC ............ H04L 25/0222; H04L 27/2613; H04L 2027/0067; H04L 27/2675; H04L 5/0051;
(Continued)

(56) References Cited

U.S. PATENT DOCUMENTS 10,848,285 B2 * 11/2020 Yoo ..................... H04W 72/042
2018/0279296 A1 * 9/2018 Hosseini ........... H04W 72/0413
(Continued)

FOREIGN PATENT DOCUMENTS

EP          3846561 A1 *  7/2021  .......... H04L 1/1812
WO    WO-2021031939 A1 *  2/2021

OTHER PUBLICATIONS

Interdigital., et al., "Joint Channel Estimation for PUSCH", 3GPP TSG RAN WG1 #106-e, R1-2107652, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, 12 Pages, XP052038545, Sections 1-3, the whole document.
(Continued)

*Primary Examiner* — Lana N Le
(74) *Attorney, Agent, or Firm* — Procopio, Cory, Hargreaves & Savitch LLP/Qualcomm Incorporated

(57) ABSTRACT

Apparatus, methods, and computer-readable media for facilitating phase jump estimation for SL DMRS bundling are disclosed herein. An example method includes receiving, from another device, first information at a first symbol of a first slot, the first slot including at least the first symbol and a first reference signal. The example method also includes receiving second information at a second symbol of a second slot, the second slot including at least the second symbol and
(Continued)

a second reference signal, the first information and the second information being repetitions. The example method also includes generating a first reference signal copy based at least on the second reference signal and a phase jump between the first slot and the second slot. Additionally, the example method includes performing channel estimation across the first slot and the second slot based on an aggregation of the first reference signal and the first reference signal copy.

30 Claims, 20 Drawing Sheets

(58) Field of Classification Search
CPC .......... H04L 25/0228; H04L 25/03178; H04L 25/0202; H04L 25/024; H04L 25/03292; H04L 7/0062; H04L 27/2697; H04L 27/2695; H04L 27/2662; H04W 52/52; H04W 52/54; H04W 72/042; H04W 72/0446; H04W 72/1278; H04W 72/0453; H04W 72/1268; H04W 74/006; H04W 72/1289; H04W 72/0406; H04W 24/10; H04W 24/08; H04W 52/04; H04W 52/46; H04W 92/18; H04W 52/146; H04W 52/38; H04W 72/1273; H04W 84/047; H04W 88/06

See application file for complete search history.

(56) References Cited

U.S. PATENT DOCUMENTS

| 2020/0260500 | A1* | 8/2020 | Agiwal | H04W 74/004 |
| 2020/0319281 | A1* | 10/2020 | Papakasellariou | H04L 5/0053 |
| 2021/0099954 | A1* | 4/2021 | Agiwal | H04W 72/0493 |
| 2022/0368568 | A1* | 11/2022 | Taherzadeh | H04L 5/0094 |

OTHER PUBLICATIONS

International Search Report and Written Opinion—PCT/US2022/041281—ISA/EPO—dated Dec. 8, 2022, 10 pages.
Qualcomm Incorporated: "Joint Channel Estimation for PUSCH", 3GPP TSG-RAN WG1 Meeting #105e, R1-2104687, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021, XP052010938, 9 Pages, the whole document.

* cited by examiner

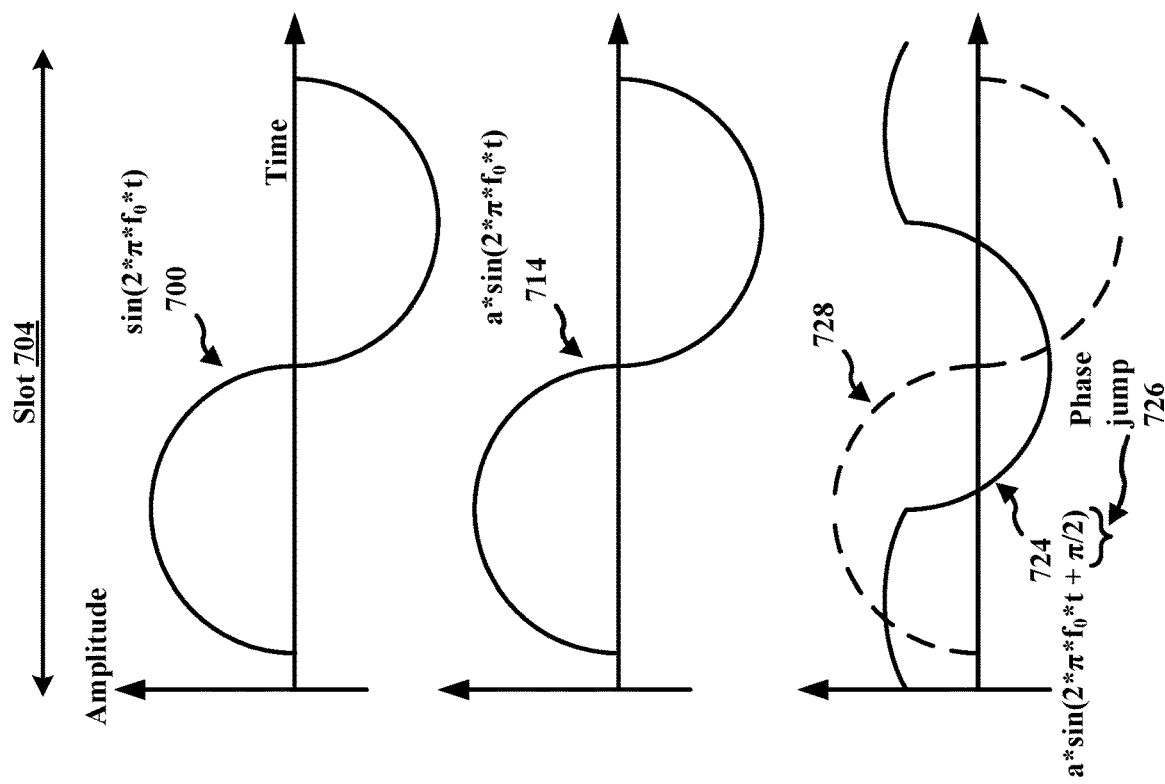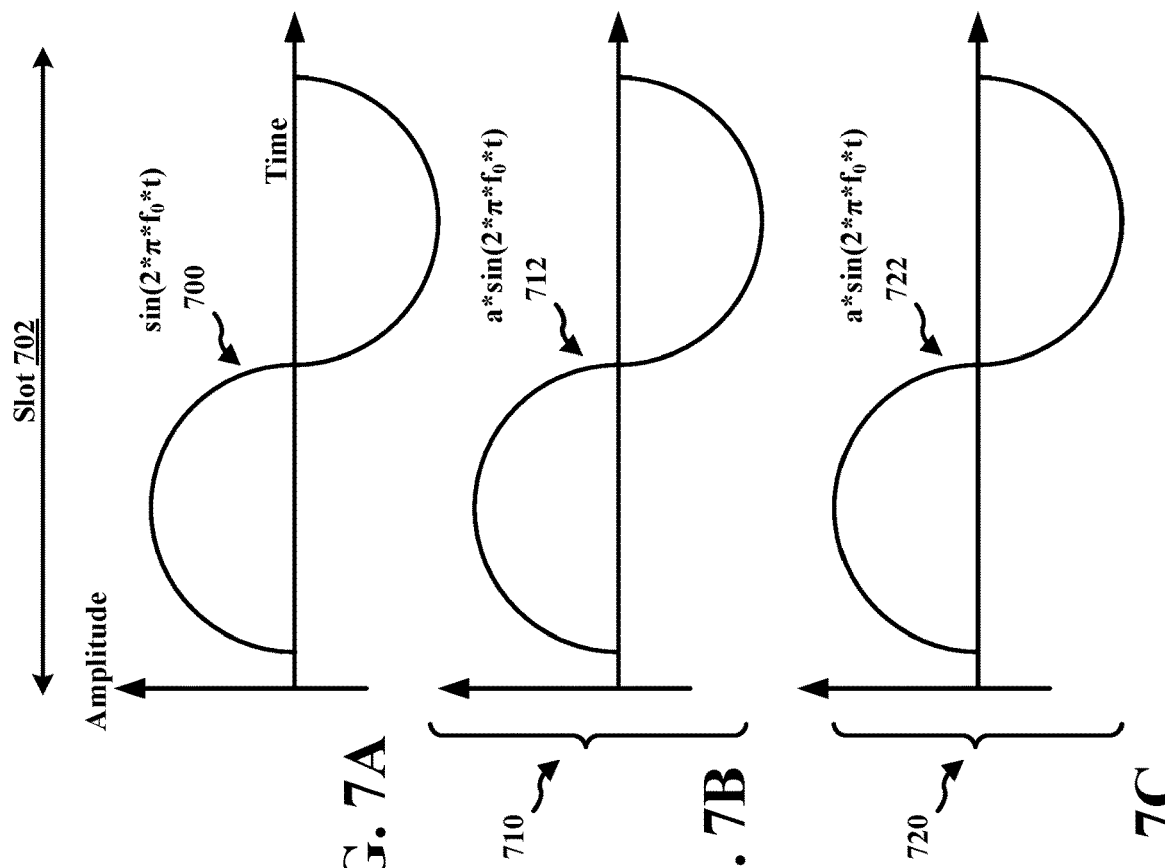
FIG. 7A
FIG. 7B
FIG. 7C

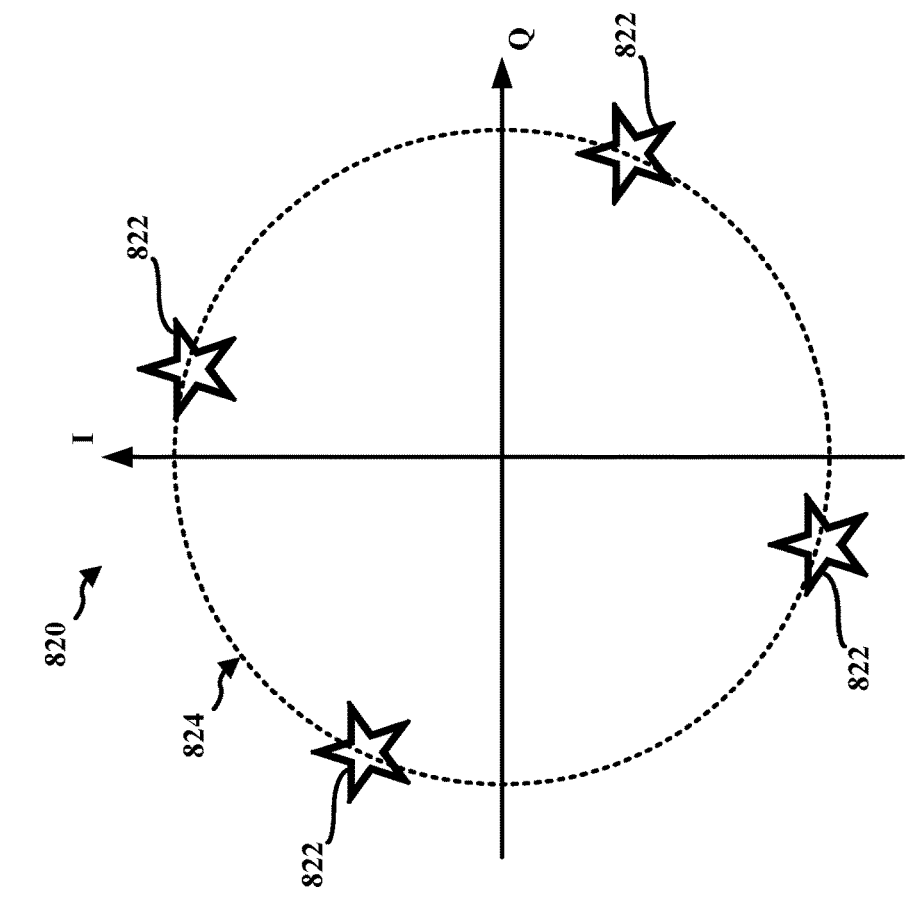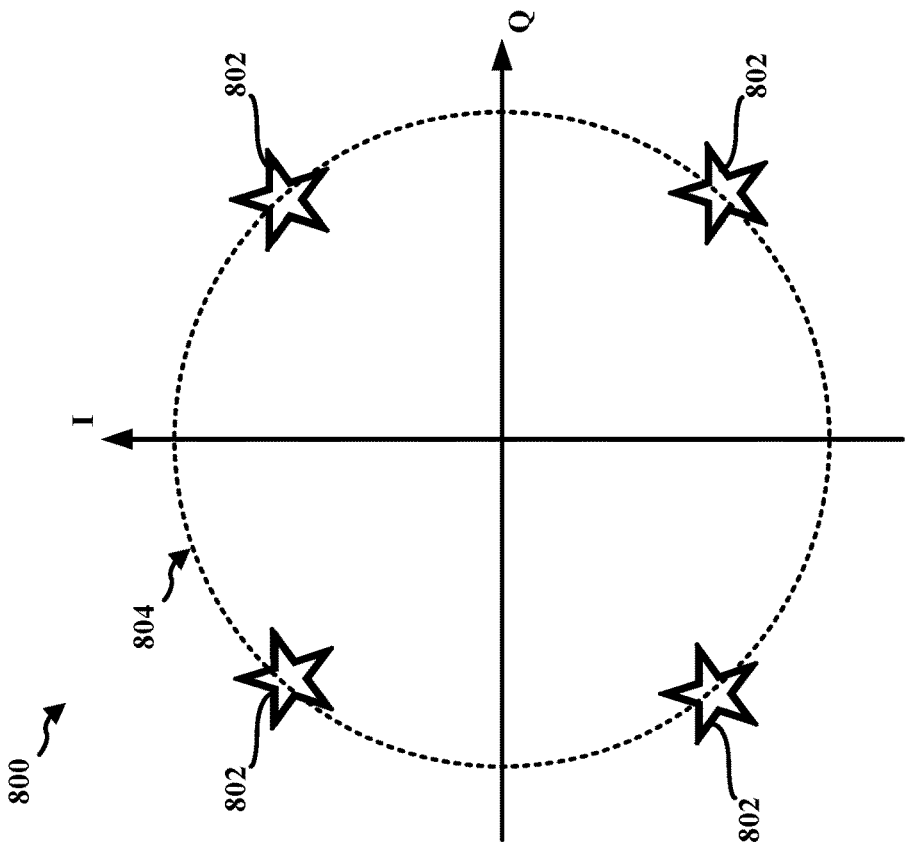
FIG. 8

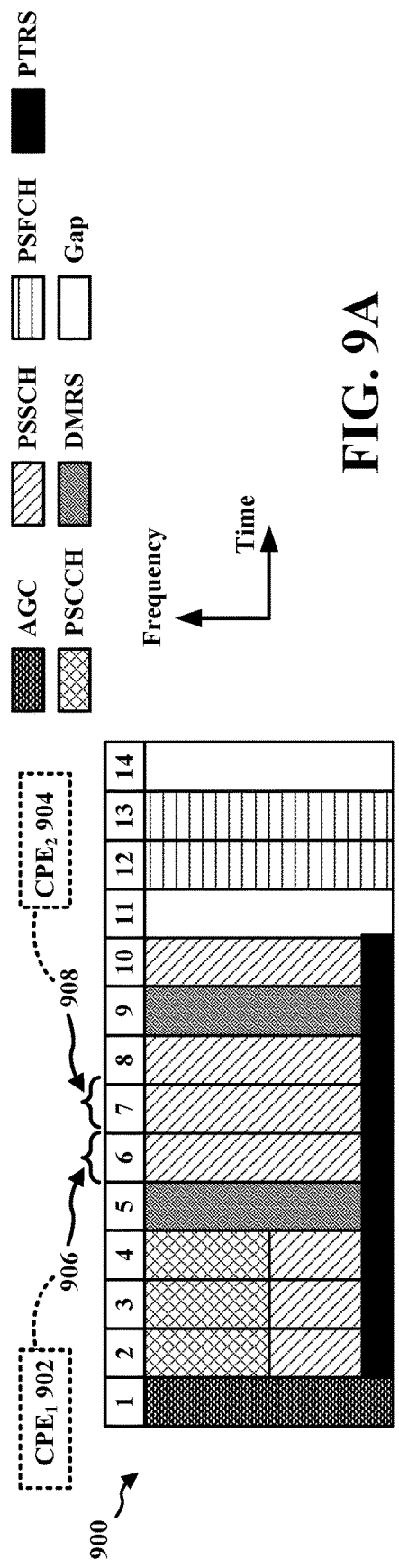
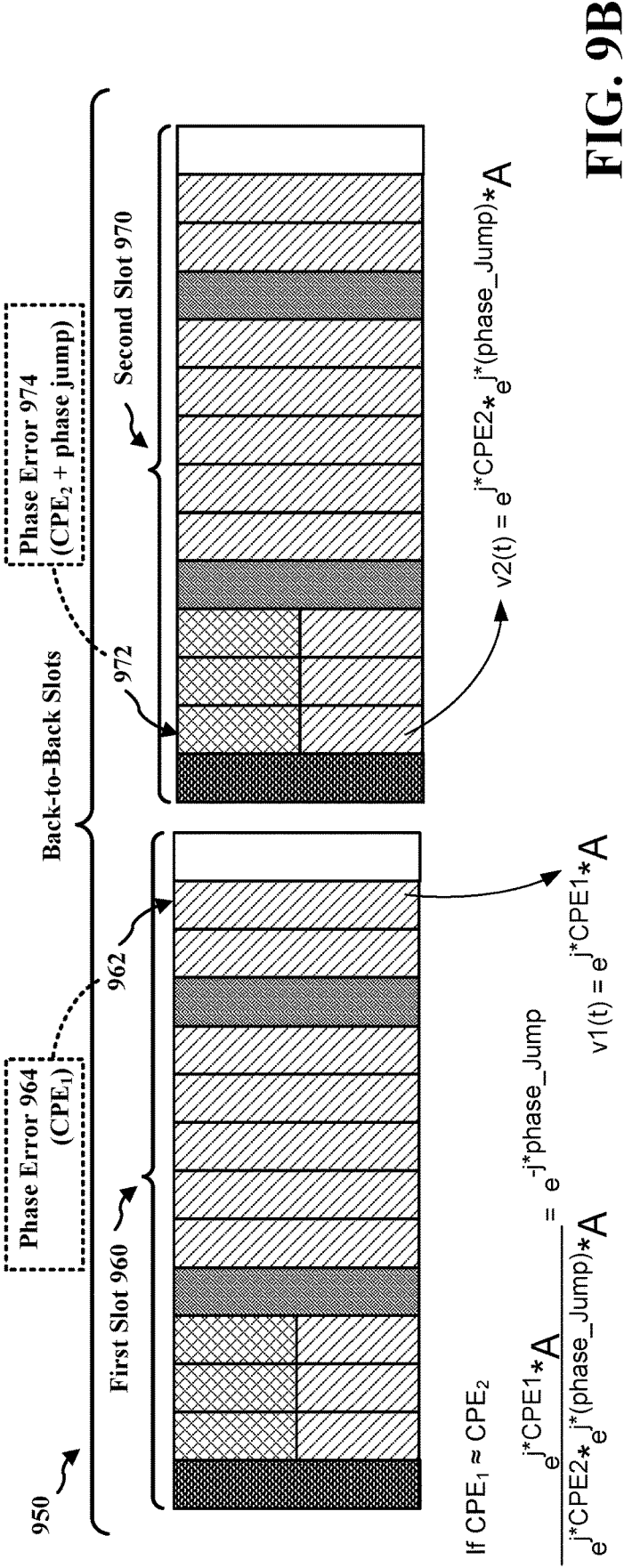
FIG. 9A
FIG. 9B

US 11,646,912 B2

TECHNIQUES TO FACILITATE PHASE JUMP ESTIMATION FOR SIDELINK DMRS BUNDLING

INTRODUCTION

The present disclosure relates generally to communication systems, and more particularly, to sidelink communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication at a first wireless device is provided. The method may include receiving, from a second wireless device, first information at a first symbol of a first slot, the first slot including at least the first symbol and a first reference signal. The example method may also include receiving second information at a second symbol of a second slot, the second slot including at least the second symbol and a second reference signal, the first information and the second information being repetitions. Additionally, the example method may include generating a first reference signal copy based at least on the second reference signal and a phase jump between the first slot and the second slot, the phase jump based on a first phase error associated with the first symbol and a second phase error associated with the second symbol. The example method may also include performing channel estimation across the first slot and the second slot based on an aggregation of the first reference signal and the first reference signal copy.

In another aspect of the disclosure, an apparatus for wireless communication is provided. The apparatus may be a UE that includes a memory and at least one processor coupled to the memory, the memory and the at least one processor configured to receive, from a second wireless device, first information at a first symbol of a first slot, the first slot including at least the first symbol and a first reference signal. The memory and the at least one processor may also be configured to receive second information at a second symbol of a second slot, the second slot including at least the second symbol and a second reference signal, the first information and the second information being repetitions. Additionally, the memory and the at least one processor may be configured to generate a first reference signal copy based at least on the second reference signal and a phase jump between the first slot and the second slot, the phase jump based on a first phase error associated with the first symbol and a second phase error associated with the second symbol. The memory and the at least one processor may also be configured to perform channel estimation across the first slot and the second slot based on an aggregation of the first reference signal and the first reference signal copy.

In another aspect of the disclosure, an apparatus for wireless communication at a UE is provided. The apparatus may include means for receiving, from a second wireless device, first information at a first symbol of a first slot, the first slot including at least the first symbol and a first reference signal. The example apparatus may also include means for receiving second information at a second symbol of a second slot, the second slot including at least the second symbol and a second reference signal, the first information and the second information being repetitions. Additionally, the example apparatus may include means for generating a first reference signal copy based at least on the second reference signal and a phase jump between the first slot and the second slot, the phase jump based on a first phase error associated with the first symbol and a second phase error associated with the second symbol. The example apparatus may also include means for performing channel estimation across the first slot and the second slot based on an aggregation of the first reference signal and the first reference signal copy.

In another aspect of the disclosure, a non-transitory computer-readable storage medium storing computer executable code for wireless communication at a UE is provided. The code, when executed, may cause a processor to receive, from a second wireless device, first information at a first symbol of a first slot, the first slot including at least the first symbol and a first reference signal. The example code, when executed, may also cause the processor to receive second information at a second symbol of a second slot, the second slot including at least the second symbol and a second reference signal, the first information and the second information being repetitions. Additionally, the example code, when executed, may cause the processor to generate a first reference signal copy based at least on the second reference signal and a phase jump between the first slot and the second slot, the phase jump based on a first phase error associated with the first symbol and a second phase error associated with the second symbol. The example code, when executed, may also cause the processor to perform channel estimation across the first slot and the second slot based on an aggregation of the first reference signal and the first reference signal copy.

In an aspect of the disclosure, a method of wireless communication, with a first wireless device, at a second wireless device is provided. The method may include transmitting, to the first wireless device, first information at a first symbol of a first slot, the first slot including at least the first symbol and a first reference signal. The example method may also include transmitting second information at a second symbol of a second slot, the second slot including at least the second symbol and a second reference signal, the first information and the second information being repetitions.

In another aspect of the disclosure, an apparatus for wireless communication, with a first wireless device, at a second wireless device is provided. The apparatus may be a UE that includes a memory and at least one processor coupled to the memory, the memory and the at least one processor configured to transmit, to the first wireless device, first information at a first symbol of a first slot, the first slot including at least the first symbol and a first reference signal. The memory and the at least one processor may also be configured to transmit second information at a second symbol of a second slot, the second slot including at least the second symbol and a second reference signal, the first information and the second information being repetitions.

In another aspect of the disclosure, an apparatus for wireless communication, with a first wireless device, at a second wireless device is provided. The apparatus may include means for transmitting, to the first wireless device, first information at a first symbol of a first slot, the first slot including at least the first symbol and a first reference signal. The example apparatus may also include means for transmitting second information at a second symbol of a second slot, the second slot including at least the second symbol and a second reference signal, the first information and the second information being repetitions.

In another aspect of the disclosure, a non-transitory computer-readable storage medium storing computer executable code for wireless communication, with a first wireless device, at a second wireless device is provided. The code, when executed, may cause a processor to transmit, to the first wireless device, first information at a first symbol of a first slot, the first slot including at least the first symbol and a first reference signal. The example code, when executed, may also cause the processor to transmit second information at a second symbol of a second slot, the second slot including at least the second symbol and a second reference signal, the first information and the second information being repetitions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7A illustrates an example signal that may be transmitted in a first slot and a second slot, in accordance with aspects presented herein.

FIG. 7B illustrates the example signal of FIG. 7A transmitted in a first scenario maintaining phase continuity between the first slot and the second slot, in accordance with aspects presented herein.

FIG. 7C illustrates the example signal of FIG. 7A transmitted in a second scenario including a phase jump between the first slot and the second slot, in accordance with aspects presented herein.

FIG. 8 illustrates examples for mapping tones to a constellation, in accordance with aspects presented herein.

FIG. 9A illustrates an example slot including 14 symbols, in accordance with aspects presented herein.

FIG. 9B illustrates an example including back-to-back slots, in accordance with aspects presented herein.

DETAILED DESCRIPTION

Figure 1:
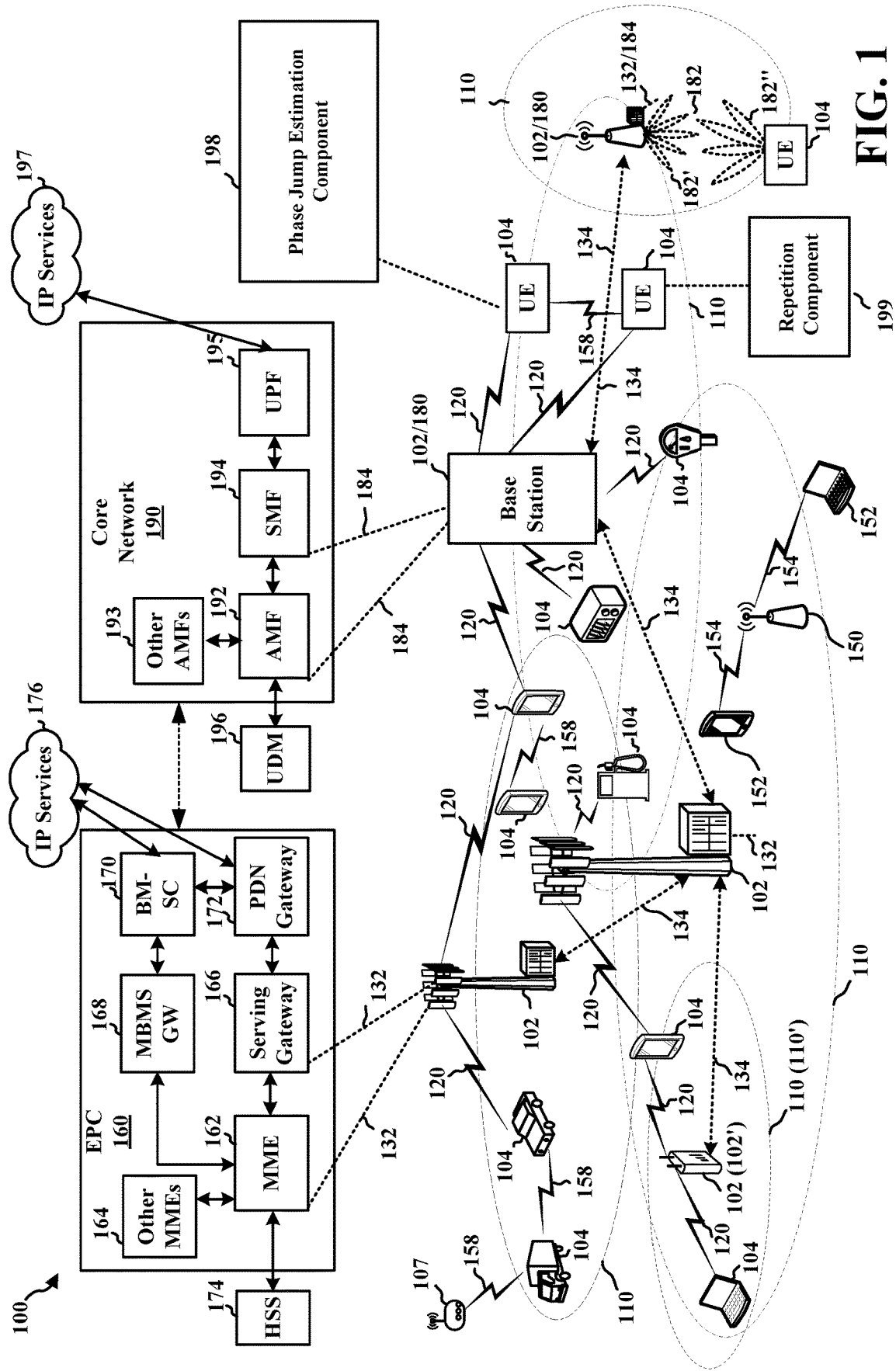
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

In some wireless communications systems, data transmissions by a transmitting device may be accompanied by demodulation reference signals (DMRS), which may be used by a receiving device to support demodulating or otherwise decoding the data transmissions. In some cases, techniques for bundling of demodulation reference signals may be supported, and the receiving device may be configured to assume that the same precoder is used by a transmitting device across the data channels of different scheduling units. For example, when demodulation reference signals are transmitted over different time intervals or different antenna ports, demodulation reference signals over different time instants or antenna ports can be coherently filtered or otherwise processed by a receiving device to enhance the accuracy or efficiency of channel estimation for physical channel transmissions.

Sidelink DMRS bundling may refer to transmitting a sidelink DMRS over multiple slots for coherent combining. Coherent combining may refer to increasing a power of a signal by combining the signal across slots. For example, the signal in a first slot may be added to a signal in a second slot to perform coherent combining (e.g., the signal in the first slot and the signal in the second slot may be aggregated). Sidelink DMRS bundling may be used in scenarios in which the signal-to-noise ratio (SNR) at a receiving device is low, which may reduce the ability of the receiving device to accurately estimate channel conditions using DMRS in one slot. When sidelink DRMS bundling is employed, the receiving device may use DMRS symbols across multiple slots (e.g., within a bundling window) to improve the channel estimation, for example, in scenarios with low SNR. For example, the receiving device may use DMRS from a first slot DMRS symbol and DMRS from a second slot DMRS symbol to improve channel estimation across the slots of the bundling window.

To perform sidelink DMRS bundling, the channel within the bundling window is assumed to be the same. For example, if the first slot is associated with a first channel and the second slot is associated with a second channel different than the first channel, then conditions across the first slot and the second slot may be different such that combining DMRS symbols across the slots may not provide a useful estimation of channel conditions. For example, in high mobility scenarios, such as V2X, the high Doppler effect may result in fast changing channels, which may reduce the benefits of performing sidelink DMRS bundling.

Thus, sidelink DMRS bundling may be performed in low mobility scenarios with slow changing channels. For example, in a low mobility scenario, the channel may change slowly due to low Doppler effect. In such scenarios, the DMRS at the first slot DMRS symbol and the second slot DMRS symbol may be the same and, thus, coherent combining of the DMRS symbols may be used to estimate the channel conditions.

However, the DMRS at the first slot DMRS symbol and the second slot DMRS symbol may be different due to phase jump. A phase jump may refer to a change in phase across slots. For example, a transmitting device may transmit a same OFDM symbol "A" at the first slot DMRS symbol and the second slot DMRS symbol. A random phase term may be introduced by RF components at the transmitting device and/or the receiving device. When the phase term is the same at the first slot and the second slot, then phase continuity is maintained from the first slot to the second slot. When the phase term is different, then there is a phase jump from the first slot to the second slot.

When a receiving device estimates channel conditions for the first slot and the second slot separately, then different random phase terms may be acceptable. For example, when the receiving device estimates a first channel condition based on the DMRS of the first slot and also estimates a second channel condition based on the DMRS of the second slot, then different random phase terms across the slots do not impact the respective channel condition estimates. However, when DMRS symbols are being combined across multiple slots to estimate the condition of the channel (e.g., across the slots of the bundling window), then the different random phase terms may reduce the accuracy of the condition estimate for the channel and/or may prevent performing DMRS bundling across the slots of the bundling window. By accurately estimating channel conditions, a higher MCS may be selected, which may increase throughput.

When phase continuity is broken between the first slot and the second slot, the receiving device may receive a second slot signal that includes a phase jump. The phase jump may be introduced by the transmitting device and/or the receiving device.

In addition to phase jump, a signal may incur phase noise. Phase noise may be introduced due to different clocks in each device (e.g., a transmitting device and/or a receiving device). If the clock is offset from a "true time," then the offset introduces a phase noise.

When phase noise occurs, each of the tones of a symbol are rotated due to the phase noise. For example, each of the tones may be rotated by a same amount, which may be referred to as a common phase error (CPE).

While CPE may represent the rotation experienced by each tone in a symbol, the phase noise may be time-varying. That is, each symbol may experience a different CPE. However, the phase noise may be slowly time-varying. For example, the CPE experienced by neighboring symbols may be similar. As used herein, two CPEs may be referred to as "similar" when the difference between a first CPE and a second CPE is less than a threshold. For example, a threshold may include a particular quantity of degrees (e.g., one degree, two degree, etc.) with respect to phase and/or a particular value in magnitude (e.g., one decibel (dB), two dB, etc.).

While phase noise and phase jump may both impact a signal, a signal distortion due to phase noise and a signal distortion due to phase jump are different. However, if the CPE at two symbols can be determined to be the same, then phase error difference determined between the two symbols can be attributed to phase jump.

Aspects disclosed herein provide techniques for estimating the phase jump between a first slot and a second slot. In some examples, by estimating the phase jump, the receiving device may remove the phase jump to generate a copy of a signal at the first slot. The receiving device may then use the received signal of the first slot and the copy of the signal of the first slot with phase jump removed to perform joint channel estimation, such as DMRS bundling.

Additionally, and as described herein, the CPE experienced at two symbols may be similar when the two symbols are neighboring symbols. Moreover, if the CPE is the same at the two symbols, then the difference in phase error difference between a phase error determined at the second symbol and a phase error determined at the first symbol may be attributed to phase jump. Thus, aspects disclosed herein provide techniques for performing DMRS bundling over a first slot and a second slot that are a threshold quantity of slots apart and using a first symbol of the first slot and a second symbol of the second slot that are associated with a similar CPE to estimate the phase jump.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104, or other device communicating based on sidelink (e.g., a first wireless device), may include a phase jump estimation component 198 configured to receive, from a second wireless device, first information at a first symbol of a first slot, the first slot including at least the first symbol and a first reference signal. The example phase jump estimation component 198 may also be configured to receive second information at a second symbol of a second slot, the second slot including at least the second symbol and a second reference signal, the first information and the second information being repetitions. Additionally, the example phase jump estimation component 198 may be configured to generate a first reference signal copy based at least on the second reference signal and a phase jump between the first slot and the second slot, the phase jump based on a first phase error associated with the first symbol and a second phase error associated with the second symbol. The example phase jump estimation component 198 may also be configured to perform channel estimation across the first slot and the second slot based on an aggregation of the first reference signal and the first reference signal copy.

Still referring to FIG. 1, in certain a UE 104, or other device communicated based on sidelink (e.g., a second wireless device), may include a repetition component 199 configured to transmit, to the first wireless device, first information at a first symbol of a first slot, the first slot including at least the first symbol and a first reference signal. The example repetition component 199 may also be configured to transmit second information at a second symbol of a second slot, the second slot including at least the second symbol and a second reference signal, the first information and the second information being repetitions.

The aspects presented herein may enable a first wireless device to estimate a phase jump between a first slot and a second slot, which may facilitate improving communication performance, for example, by improving channel estimation and increasing throughput.

Although the following description provides examples directed to 5G NR (and, in particular, to sidelink communication), the concepts described herein may be applicable to other similar areas, such as LTE, LTE-A, CDMA, GSM, and/or other wireless technologies, in which a first wireless device may communicate with a second wireless device, such as in a Uu link.

Additionally, while the following description provides examples of estimating a phase jump to facilitate performing DMRS bundling, the concepts described herein may be applicable to other similar areas in which a first wireless device may perform joint channel estimation.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
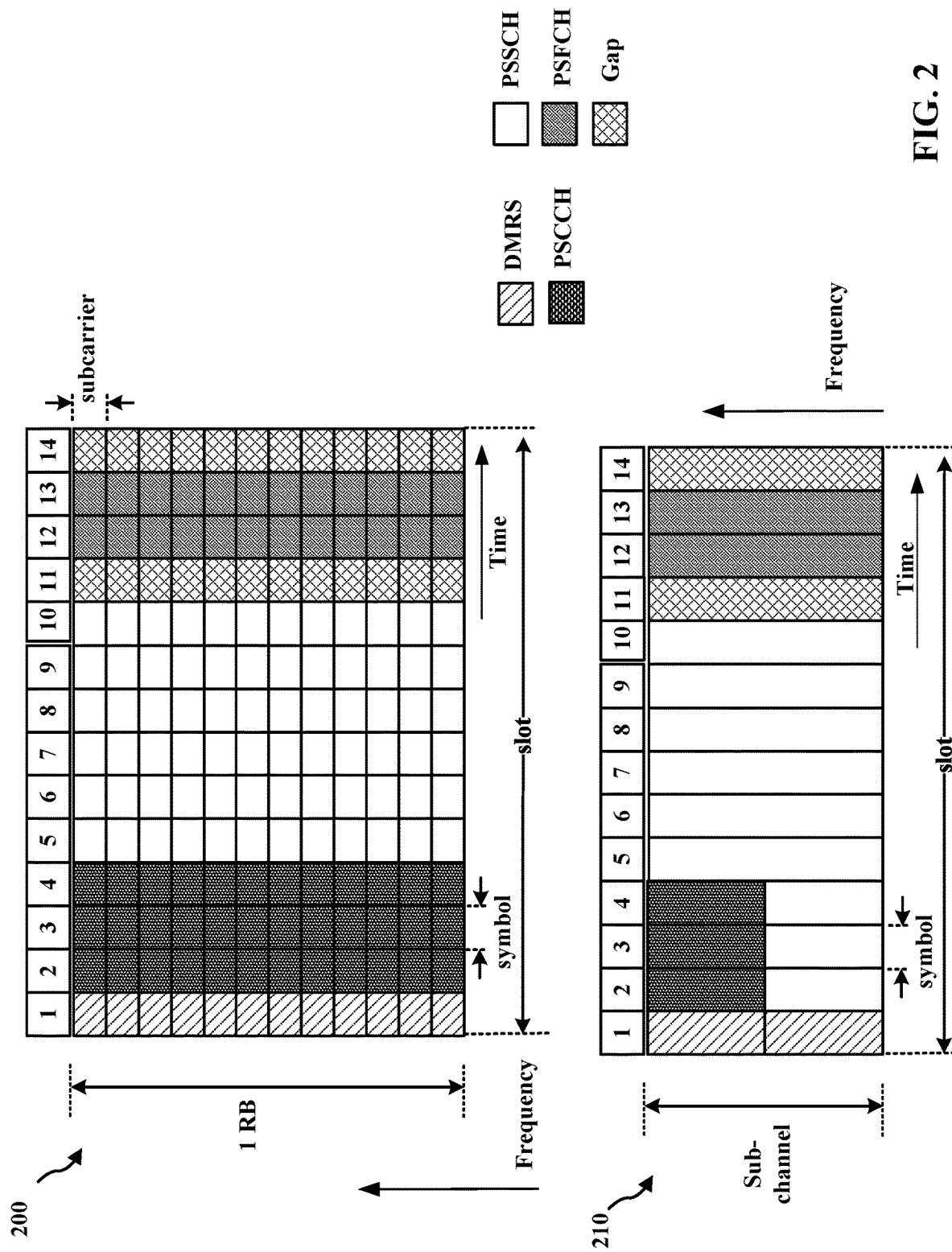
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols may be CP orthogonal frequency division multiplexing (OFDM) (CP-OFDM) symbols. The symbols may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIG. 2 provides an example of normal CP with 14 symbols per slot. Within a set of frames, there may be one or more different bandwidth parts (BWPs) that are frequency division multiplexed. Each BWP may have a particular numerology and CP (normal or extended).

Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
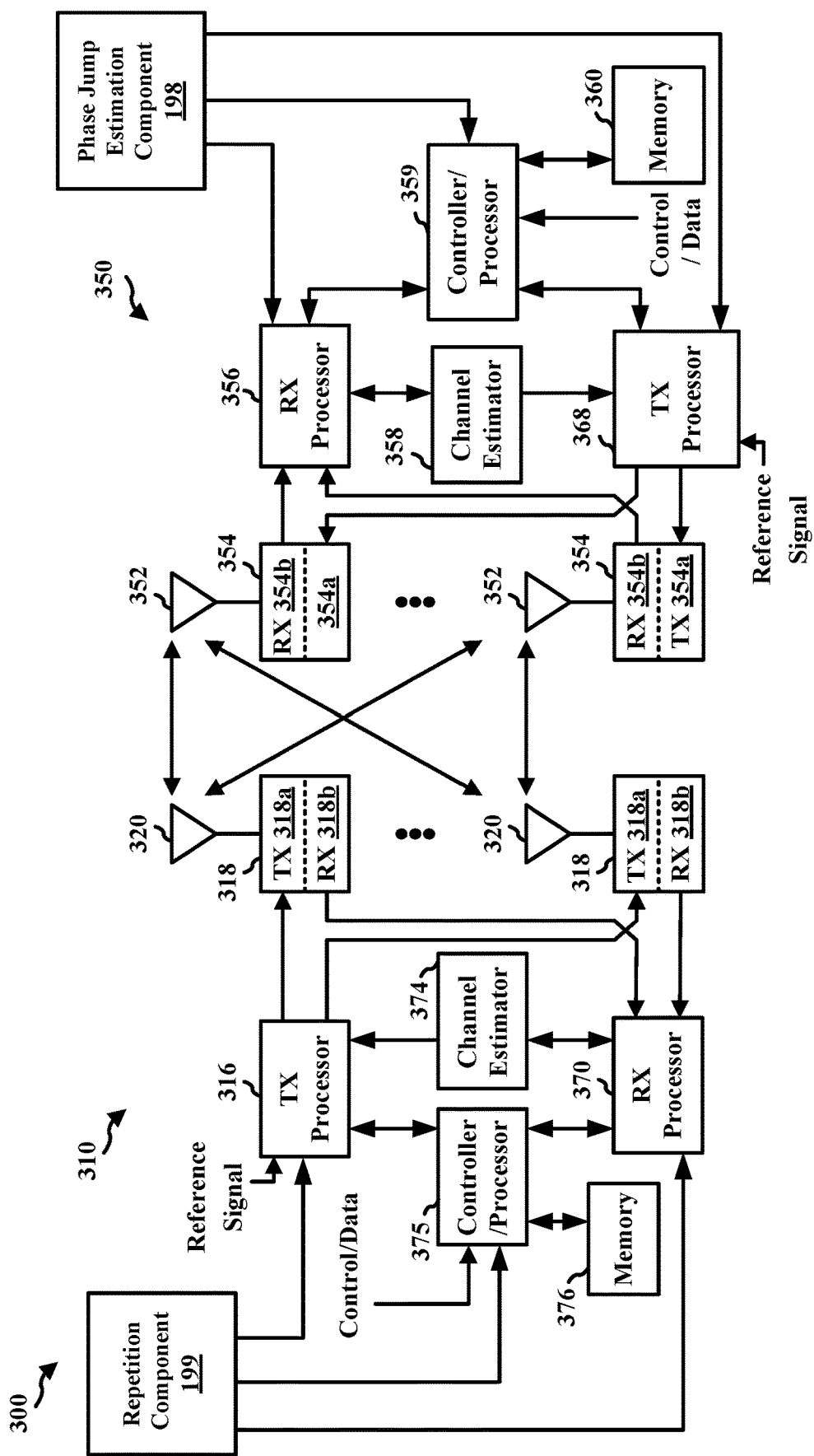
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350. The communication may be based on sidelink or an access link. In some examples, the wireless communication devices 310, 350 may communicate based on V2X or other D2D communication. In other aspects, the wireless communication devices 310, 350 may communicate over an access link based on uplink and downlink transmissions. The communication may be based on sidelink using a PC5 interface (e.g., between two UEs). The communication may be based on an access link using a Uu interface (e.g., between a base station and a UE). The wireless communication devices 310, 350 may comprise a UE, an RSU, a base station, etc. In some implementations, the first wireless communication device 310 may correspond to a base station and the second wireless communication device 350 may correspond to a UE.

As shown in FIG. 3, the first wireless communication device 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example second wireless communication device 350 includes antennas 352, a transceiver 354 including a transmitter 354a and a receiver 354b, an RX processor 356, a channel estimator 358, a controller/processor 359, memory 360, and a TX processor 368. In other examples, the first wireless communication device 310 and/or the second wireless communication device 350 may include additional or alternative components.

Packets may be provided to the controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the second wireless communication device 350. Each spatial stream may then be provided to a different antenna 320 via a separate transmitter 318a. Each transmitter 318a may modulate a radio frequency (RF) carrier with a respective spatial stream for transmission.

At the second wireless communication device 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the second wireless communication device 350. If multiple spatial streams are destined for the second wireless communication device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the first wireless communication device 310. These soft decisions may be based on channel estimates computed by the channel estimator 358. The soft decisions are then decoded and deinterleaved to recover the data and control signals that were originally transmitted by the first wireless communication device 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by the first wireless communication device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the first wireless communication device 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The transmission is processed at the first wireless communication device 310 in a manner similar to that described in connection with the receiver function at the second wireless communication device 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the phase jump estimation component 198 of FIG. 1.

At least one of the TX processor 316, the RX processor 370, and the controller/processor 375 may be configured to perform aspects in connection with the repetition component 199 of FIG. 1.

Figure 4:
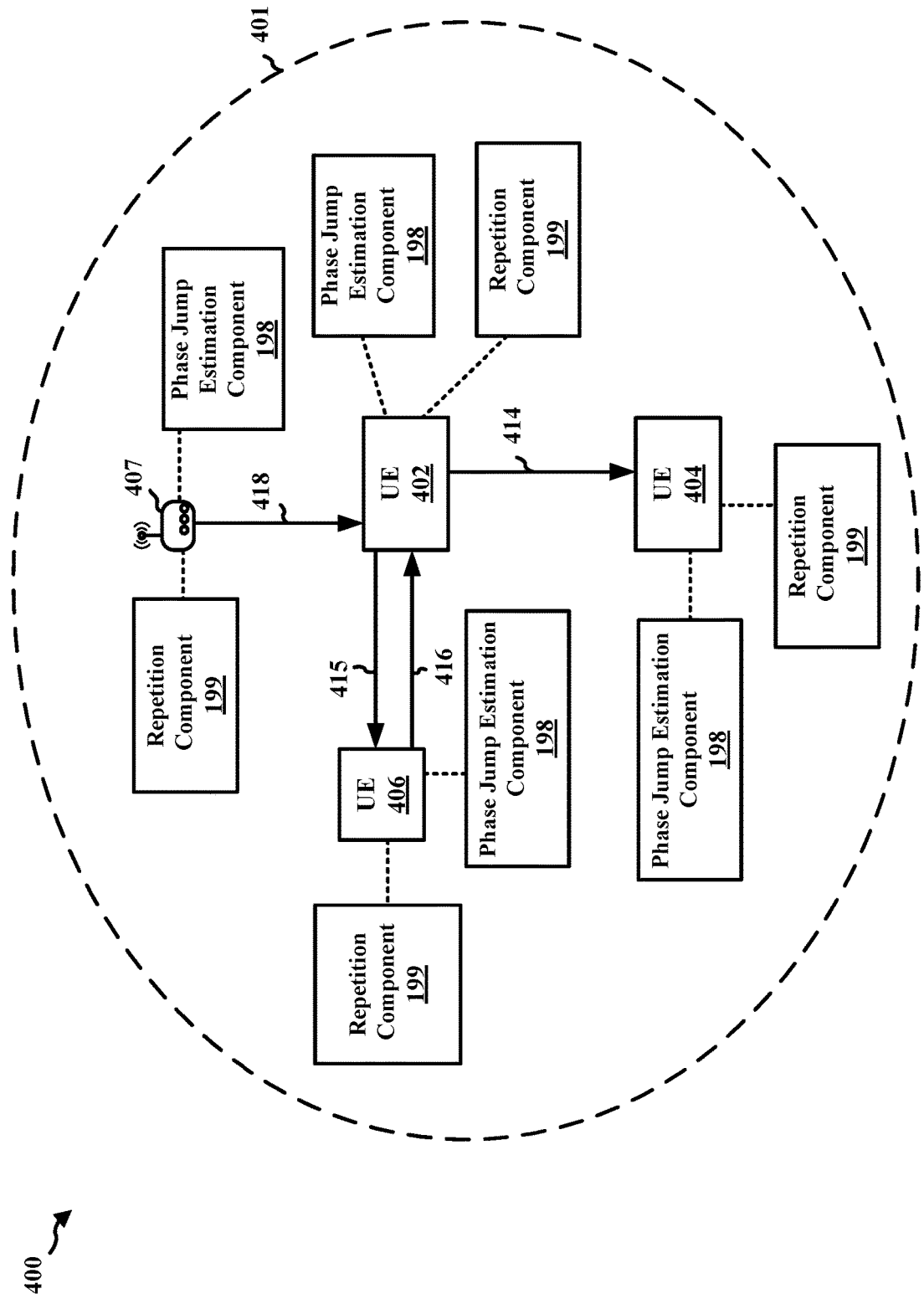
FIG. 4 illustrates example aspects of sidelink communication between devices, in accordance with aspects presented herein.

FIG. 4 illustrates an example 400 of sidelink communication between devices, as presented herein. The communication may be based on a slot structure comprising aspects described in connection with FIG. 2 or another sidelink structure. For example, a first UE 402 may transmit a sidelink transmission 414, e.g., comprising a control channel (e.g., PSCCH) and/or a corresponding data channel (e.g., PSSCH), that may be received by a second UE 404 and/or a sidelink transmission 415 that may be received by a third UE 406 directly from the first UE 402, e.g., without being transmitting through a base station. Additionally, or alternatively, an RSU 407 may receive communication from and/or transmit communication to the UEs 402, 404, 406. As shown in FIG. 4, the RSU 407 may transmit a sidelink transmission 418 to the first UE 402.

The UEs 402, 404, 406 and/or the RSU 407 may each be capable of operating as a transmitting device in addition to operating as a receiving device. For example, in the example of FIG. 4, the third UE 406 is illustrated as transmitting a sidelink transmission 416 that is received by the first UE 402. One or more of the sidelink transmissions 414, 415, 416, 418 may be broadcast or multicast to nearby devices. For example, the first UE 402 may transmit communication intended for receipt by other UEs within a range 401 of the first UE 402. In other examples, one or more of the sidelink transmissions 414, 415, 416, 418 may be groupcast to nearby devices that are a member of a group. In other examples, one or more of the sidelink transmissions 414, 415, 416, 418 may be unicast from one UE to another UE.

A sidelink transmission may provide sidelink control information (SCI) including information to facilitate decoding the corresponding data channel. The SCI may also include information that a receiving device may use to avoid interference. For example, the SCI may indicate reserved time resources and/or reserved frequency resources that will be occupied by the data transmission, and may be indicated in a control message from the transmitting device.

One or more of the UEs 402, 404, 406 and/or the RSU 407 may include a phase jump estimation component, similar to the phase jump estimation component 198 described in connection with FIG. 1. One or more of the UEs 402, 404, 406 and/or the RSU 407 may additionally or alternatively include a reference signal component, similar to the repetition component 199 described in connection with FIG. 1.

In some wireless communications systems, data transmissions by a transmitting device may be accompanied by demodulation reference signals, which may be used by a receiving device to support demodulating or otherwise decoding the data transmissions. The transmitting device and the receiving device may each use a precoding configuration, which may be negotiated or otherwise communicated between the transmitting device and the receiving device. Aspects of the precoding configuration may support encoding the data transmission by the transmitting device and decoding the encoded data transmission by the receiving device. In some cases, techniques for bundling of demodulation reference signals may be supported, and the receiving device may be configured to assume that the same precoder is used by a transmitting device across the data channels of different scheduling units. For example, when demodulation reference signals are coherently transmitted over different time intervals or different antenna ports, demodulation reference signals over different time instants or antenna ports can be coherently filtered or otherwise processed by a receiving device to enhance the accuracy or efficiency of channel estimation for physical channel transmissions.

Figure 5:
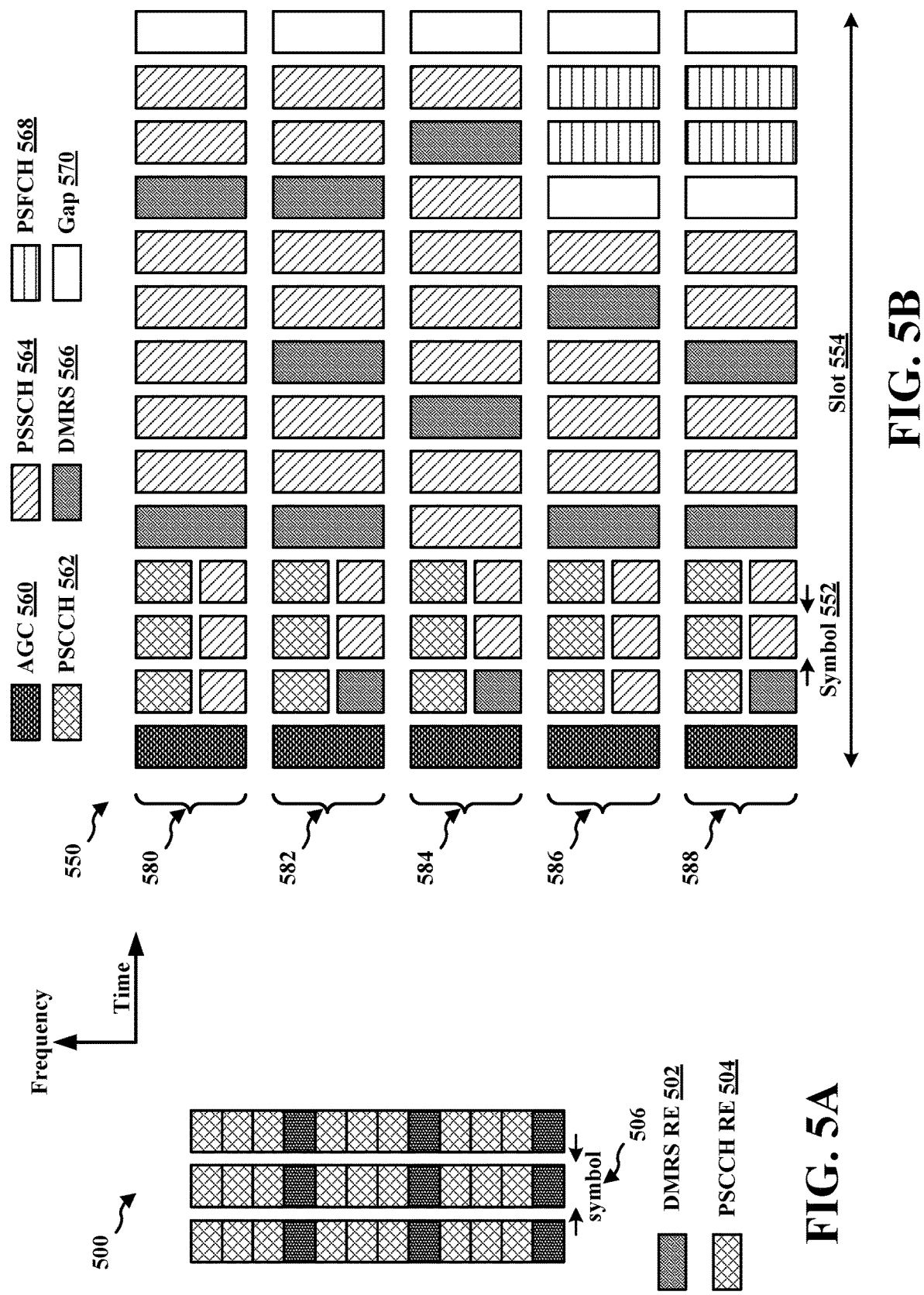
FIG. 5A illustrates an example sidelink control channel demodulation reference signal pattern in a frequency-domain, in accordance with aspects presented herein.
FIG. 5B illustrates example slot structures in a time-domain, in accordance with aspects presented herein.

Demodulation reference signals may be transmitted in combination with physical control channel transmissions and physical data channel transmissions. For example, in sidelink communications, demodulation reference signals may be transmitted with PSCCH transmissions and/or PSSCH transmissions. With respect to PSCCH transmissions, demodulation reference signals may be present in PSCCH symbols and may be placed in a pattern. For example, FIG. 5A illustrates an example PSCCH DMRS pattern 500 in a frequency-domain (FD). The example PSCCH DMRS pattern 500 includes DMRS resource elements 502 and PSCCH resource elements 504. In the illustrated example PSCCH DMRS pattern 500 of FIG. 5A, the DMRS resource elements 502 are placed at every fourth resource element of a PSCCH symbol 506 (e.g., a symbol containing PSSCH resource elements). However, in other examples, the positioning of DMRS resource elements in a PSCCH symbol may be different. The DMRS resource elements 502 may be drawn from (or derived from) a Gold sequence.

Referring to PSSCH transmissions, demodulation reference signals may be present in 2 symbol, 3 symbol, and 4 symbol DMRS patterns that may be configured or preconfigured. For example, a transmitting device may select a DMRS pattern and signal the selected DMRS pattern to a receiving device using SCI (e.g., a first stage SCI). Similar to the DMRS resource elements of a PSCCH transmission, the DMRS resource elements of a PSSCH transmission may be drawn from (or derived from) a Gold sequence.

FIG. 5B illustrates example slot structures 550 in a time-domain (TD). The example slot structures 550 include symbols 552 in a slot 554. The example slot structures 550 include three example PSSCH DMRS patterns 580, 582, 584 without feedback and two example PSSCH DMRS patterns 586, 588 with feedback (e.g., symbols including PSFCH 568).

Each of the symbols 552 in a slot may be associated with automatic gain control (AGC) (e.g., AGC 560), control information (e.g., PSCCH 562), data (e.g. PSSCH 564), demodulation reference signals (e.g., DMRS 566), feedback (e.g., PSFCH 568), or a gap (e.g., gap 570). For example, in each of the example PSSCH DMRS patterns 580, 582, 584, 586, 588, a first symbol includes AGC 560 and a last symbol is a guard symbol including a gap 570. The first symbol containing AGC 560 facilitates a receiving device to adjust the gain of the receiver amplifier to fit the total power of the received signal. The total power of the received signal may include the power associated with the transmission and interference (e.g., due to neighboring devices). The guard symbol including the gap 570 provides a switching time to allow the receiving device to facilitate switching between sidelink transmission/reception (and vice versa), and to facilitate switching between sidelink and downlink/uplink transmissions (and vice versa). For example, a receiving device may use the guard symbol to switch from a first beam to receive a transmission to a second beam to transmit a transmission. A symbol including feedback (e.g., PSFCH 568) may include ACK/NACK feedback to facilitate HARQ operations.

In some examples, a symbol may include control information and data and/or DMRS. For example, in a first PSSCH DMRS pattern 580 and a fourth PSSCH DMRS pattern 586, a second symbol, a third symbol, and a fourth symbol each include a control portion (e.g., PSCCH 562)

and a data portion (e.g. PSSCH 564). In a second PSSCH DMRS pattern 582, a third PSSCH DMRS pattern 584, and a fifth PSSCH DMRS pattern 588, a second symbol includes a control portion (e.g., PSCCH 562) and a DMRS portion (e.g., DMRS 566).

The positioning of DMRS in a PSSCH transmission may be based on different configuration types. In the example slot structures 550 of FIG. 5B, a symbol (or a portion of a symbol) containing DMRS 566 may use a configuration type 1 for the DMRS in the frequency domain. For example, the DMRS may be positioned at every other tone. The term "tone" may refer to a frequency subcarrier of a symbol. As used herein, the terms "tone" and "resource element" may be used interchangeably.

Although not shown in the examples of FIGS. 5A and 5B, it may be appreciated that other examples may include additional or alternative PSCCH DMRS patterns and/or PSSCH DMRS patterns.

Figure 6:
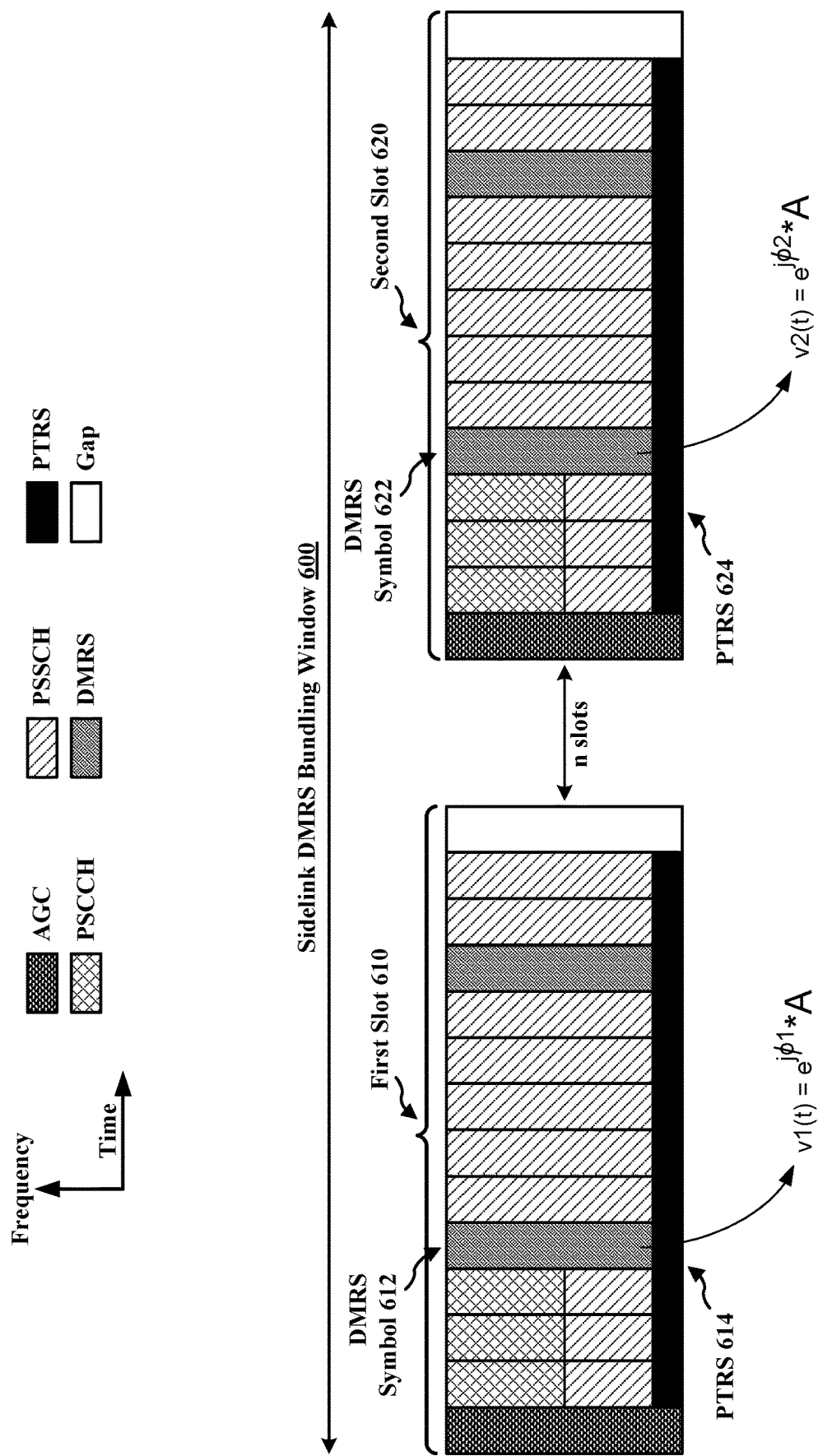
FIG. 6 illustrates an example sidelink DMRS bundling window including slots containing DMRS that may be used for channel estimation, in accordance with aspects presented herein.

Sidelink DMRS bundling may refer to transmitting a sidelink DMRS over multiple slots for coherent combining. Coherent combining may refer to increasing a received power of a signal by combining the signal across slots. For example, the signal in a first slot may be added to a signal in a second slot to perform coherent combining (e.g., the signal in the first slot and the signal in the second slot may be aggregated). FIG. 6 illustrates an example sidelink DMRS bundling window 600 including slots containing DMRS that may be used for channel estimation, as presented herein. Sidelink DMRS bundling may be used in scenarios in which the signal-to-noise ratio (SNR) at a receiving device is low, which may reduce the ability of the receiving device to accurately estimate channel conditions using DMRS in one slot. When sidelink DRMS bundling is employed, the receiving device may use DMRS symbols across multiple slots to improve the channel estimation, for example, in scenarios with low SNR.

In the illustrated example of FIG. 6, a first slot 610 includes a first slot DMRS symbol 612 and a second slot 620 includes a second slot DMRS symbol 622. A receiving device may combine the DMRS from the first slot DMRS symbol 612 and the second slot DMRS symbol 622 to improve channel estimation across the slots of the sidelink DMRS bundling window 600.

The first slot 610 and the second slot 620 may be separated by n slots. In examples in which the value of n is zero, the first slot 610 and the second slot 620 may be referred to as back-to-back slots or consecutive slots.

In the illustrated example of FIG. 6, the first slot 610 and the second slot 620 include phase tracking reference signals (PTRS). For example, the first slot 610 includes PTRS 614 and the second slot 620 includes PTRS 624. The PTRS 614, 624 may be used to estimate phase noise, for example, introduced by the transmitting device and/or the receiving device. Although the example slots 610, 620 of FIG. 6 include the PTRS 614, 624, the presence of PTRS may be based on the available bandwidth and modulation and coding scheme (MCS). For example, in scenarios in which the transmitting bandwidth is small or the MCS is low, then the transmission may not include PTRS.

To perform sidelink DMRS bundling, the channel within the sidelink DMRS bundling window 600 is assumed to be the same. For example, if the first slot 610 is associated with a first channel and the second slot 620 is associated with a second channel different than the first channel, then conditions across the first slot 610 and the second slot 620 may be different such that combining the DMRS symbols across the slots 610, 620 may be unable to provide a useful estimation of channel conditions. For example, in high mobility scenarios, such as V2X, the high Doppler effect may result in fast changing channels, which may reduce the benefits of performing sidelink DMRS bundling.

Thus, sidelink DMRS bundling may be performed in low mobility scenarios with slow changing channels. For example, in a low mobility scenario, the channel may change slowly due to low Doppler effect. In such scenarios, the DMRS at the first slot DMRS symbol 612 and the second slot DMRS symbol 622 may be the same and, thus, coherent combining of the DMRS symbols may be used to estimate the channel conditions.

However, the DMRS at the first slot DMRS symbol 612 and the second slot DMRS symbol 622 may be different due to phase jump. A phase jump may refer to a change in phase across slots. For example, in the example of FIG. 6, a transmitting device may transmit a same OFDM symbol "A" at the first slot DMRS symbol 612 and the second slot DMRS symbol 622. Equation 1 (below) may be a representation of the OFDM symbol "A" in the first slot DMRS symbol 612 as received by the receiver and Equation 2 (below) may be a representation of the OFDM symbol "A" in the second slot DMRS symbol 622 as received by the receiver.

$$v_1(t) = e^{j\theta_1} \sum_{k=0}^{N-1} X_k e^{j2\pi kt/T} \quad \text{Equation 1}$$

$$v_2(t) = e^{j\theta_2} \sum_{k=0}^{N-1} X_k e^{j2\pi kt/T} \quad \text{Equation 2}$$

In the examples of Equation 1 and Equation 2, a first term $$"\sum_{k=0}^{N-1} X_k e^{j2\pi kt/T}"$$

represents the OFDM symbol "A" in the time-domain. A second term "$e^{j\theta_n}$" represents a random phase term. The random phase term "$e^{j\theta_n}$" may be introduced by RF components at the transmitting device and/or the receiving device unbeknownst to the transmitting device or receiving device processors. When the phase term is the same at the first slot 610 and the second slot 620 (e.g., $\theta_1=\theta_2$), then phase continuity is maintained from the first slot 610 to the second slot 620. When the phase term is different (e.g., $\theta_1 \neq \theta_2$), then there is a phase jump from the first slot 610 to the second slot 620. Equation 3 (below) may be used to estimate the phase jump from the first slot 610 to the second slot 620.

$$\text{phase jump} = \theta_2 - \theta_1 \quad \text{Equation 3}$$

Even though the phase terms associated with the first slot 610 and the second slot 620 are random, in some examples, they may be the same. In such examples, phase continuity is maintained form the first slot 610 to the second slot 620. In some examples, a transmitting device may have the capability to maintain phase continuity by setting the phase terms to be equal (e.g., $\theta_1=\theta_2$). However, some transmitting devices may not have the capability to maintain phase continuity by setting the phase terms to be equal.

When a receiving device estimates channel conditions for the first slot 610 and the second slot 620 separately, then different random phase terms may be acceptable. For example, when the receiving device estimates a first channel condition based on the DMRS of the first slot 610 and also estimates a second channel condition based on the DMRS of the second slot 620, then different random phase terms across the slots 610, 620 do not impact the respective channel condition estimates. However, when DMRS symbols are being combined across multiple slots to estimate the condition of the channel (e.g., across the slots of the sidelink DMRS bundling window 600), then the different random phase terms may reduce the accuracy of the condition estimate for the channel and/or may prevent performing DMRS bundling across the slots of the sidelink DMRS bundling window 600. By accurately estimating channel conditions, a higher MCS may be selected, which may increase throughput.

For example, FIG. 7A illustrates an example signal 700 that may be transmitted in a first scenario maintaining phase continuity and a second scenario including a phase jump, as presented herein. In the illustrated example of FIG. 7A, the signal 700 may represent a signal transmitted in a first slot 702 and that is repeated in a second slot 704. FIG. 7B illustrates the example signal transmitted in a first scenario 710 maintaining phase continuity between the first slot 702 and the second slot 704, as presented herein. FIG. 7C illustrates the example signal transmitted in a second scenario 720 including a phase jump between the first slot 702 and the second slot 704, as presented herein. In the examples of FIGS. 7A, 7B, and 7C, the channel is the same over the first slot 702 and the second slot 704.

In the example first scenario 710 of FIG. 7B, phase continuity is maintained from the first slot 702 to the second slot 704. For example, a receiving device may receive a first slot signal 712 that is the signal 700 modified by a term "a," as shown in FIG. 7B. With phase continuity maintained between the first slot 702 and the second slot 704, in the example first scenario 710, the receiving device may receive a second slot signal 714 that is the signal 700 modified by the term "a." Thus, as shown in the example first scenario 710 of FIG. 7B, when phase continuity is maintained, the first slot signal 712 and the second slot signal 714 are a same signal (e.g., the second slot signal 714 may be a copy of the first slot signal 712).

In the example second scenario 720 of FIG. 7C, phase continuity is not maintained from the first slot 702 to the second slot 704 and a phase jump occurs. For example, the receiving device may receive a first slot DMRS signal 722 that is the signal 700 modified by the term "a," as shown in FIG. 7. With phase continuity broken between the first slot 702 and the second slot 704, the receiving device may receive a second slot DMRS signal 724 that includes a phase jump 726. The phase jump 726 may be introduced by the transmitting device and/or the receiving device. As shown in the example second scenario 720 of FIG. 7C, even though the channel across the first slot 702 and the second slot 704 are the same, the second slot DMRS signal 724 is different than the first slot DMRS signal 722 (e.g., the second slot DMRS signal 724 is not a copy of the first slot DMRS signal 722). However, if the value of the phase jump 726 is available to the receiving device, the receiving device may modify the second slot DMRS signal 724 based on the phase jump 726 to generate a generated DMRS signal 728 that is a copy of the first slot DMRS signal 722. The receiving device may then use the first slot DMRS signal 722 and the generated DMRS signal 728 to perform joint channel estimation, such as DMRS bundling.

In addition to phase jump, a signal may incur phase noise. Phase noise may be introduced due to different clocks in each device (e.g., a transmitting device and/or a receiving device). If the clock is offset from a "true time," then the offset introduces a phase noise.

FIG. 8 illustrates examples for mapping tones to a constellation, as presented herein. In an example first scenario 800, four example tones 802 are mapped to a constellation 804. In the illustrated example, the tones 802 are part of a same OFDM symbol and are mapped to the constellation 804 using a QPSK scheme. In the example first scenario 800, the tones 802 do not experience phase noise. For example, as shown in the example first scenario 800, the tones 802 are positioned to form a "clean" constellation.

In an example second scenario 820, four example tones 822 are mapped to a constellation 824. Similar to the first scenario 800, the tones 822 are part of a same OFDM symbol and mapped to the constellation 824 using a QPSK scheme. In the example second scenario 820, the tones 822 experience phase noise. For example, each of the tones 822 are rotated due to the phase noise. In some examples, there may be stretching and/or shrinking of the points to the constellation 824. Additionally, each of the tones 822 is rotated by a same amount, which may be referred to as a common phase error (CPE). For example, each of the tones 822 may be multiplied by the same CPE in a frequency domain. That is, each tone may be rotated by a same amount (e.g., in degrees).

In some examples, a receiving device may attempt to overcome phase noise by estimating the phase noise and then performing techniques to correct the estimated phase noise. In some examples, a PTRS may be added to a transmission to the allow the receiving device to estimate the CPE. Thus, the PTRS may facilitate a receiving device to estimate the CPE, and the CPE refers to the rotation experienced by each tone in a symbol.

While CPE may represent the rotation experienced by each tone in a symbol, the phase noise may be time-varying. That is, each symbol may experience a different CPE. However, the phase noise may be slowly time-varying. For example, the CPE experienced by neighboring symbols may be similar. As used herein, two CPEs may be referred to as "similar" when the difference between a first CPE and a second CPE is less than a threshold.

For example, FIG. 9A illustrates an example slot 900 including 14 symbols, as presented herein. In the example of FIG. 9A, a receiving device may measure a first CPE 902 at a first symbol 906 and measure a second CPE 904 at a second symbol 908. As shown in FIG. 9A, the first symbol 906 and the second symbol 908 are adjacent symbols (e.g., back-to-back symbols). In such examples in which the CPEs are associated with adjacent (or neighboring) symbols, the CPEs may be similar. For example, the first CPE 902 may be similar to the second CPE 904.

In some examples, Equation 4 (below) may be used to determine the CPE.

$$CPE = \frac{1}{N}\sum_{n=0}^{N-1} e^{j\theta[n]} \quad \text{Equation 4}$$

In Equation 4, a first term "N" refers to an OFDM FFT size, a second term "n" refers to a time sample index within an OFDM symbol, and a third phase "θ[n]" refers to a phase variation at an n-th sample in an OFDM symbol.

Referring to the example slot 900, the slot 900 includes PTRS that may be used by a receiving device to estimate the CPE experienced at a symbol. The PTRS may occupy locations at a high density in a time-domain. For example, the PTRS may be located in every 1, 2, or 4 symbols. In the example of FIG. 9A, the PTRS is included in each of symbols 2 to 10. However, as shown in FIG. 9A, the PTRS may occupy locations at a low density in a frequency domain. For example, the PTRS may be located in every 2 or 4 PRBs. Additionally, a transmitting device may forego transmitting PTRS when the transmit bandwidth is small or if the MCS is low.

While phase noise and phase jump may both impact a signal, a signal distortion due to phase noise and a signal distortion due to phase jump are different. However, if the CPE at two symbols can be determined to be the same, then phase error difference determined between the two symbols can be attributed to phase jump.

For example, FIG. 9B illustrates an example 950 including slots 960, 970 that are back-to-back slots, as presented herein. In the illustrated example 950, a term "A" represents a frequency-domain representation of a signal transmitting in a symbol 962 of a first slot 960 and that is repeated in a symbol 972 of a second slot 970. A first phase error 964 represents an amount of phase error associated with the symbol 962. In the example of FIG. 9B, the first phase error 964 corresponds to a first CPE ("CPE1"). A second phase error 974 represents an amount of phase noise associated with the symbol 972 as well as phase jump introduced by RF components at the slot boundary. In the example of FIG. 9B, the second phase error 974 corresponds to a second CPE ("CPE2") and a phase jump.

Equation 5 (below) may be a representation of the signal that a receiving device may receive in the symbol 962 of the first slot 960 and Equation 6 (below) may be a representation of the signal that the receiving device may receive in the symbol 972 of the second slot 970.

$$v_1(t)=e^{j*CPE_1}*A \qquad \text{Equation 5}$$

$$v_2(t)=e^{j*CPE_2}*e^{j*phase\_jump}*A \qquad \text{Equation 6}$$

In the examples of Equation 5 and Equation 6, a first term "$e^{j*CPE_n}$", represents the phase noise experienced at the respective symbol. A second term "$e^{j*phase\_jump}$", represents the phase jump experienced between the symbol 962 of the first slot 960 and the symbol 972 of the second slot 970.

Aspects disclosed herein provide techniques for estimating the phase jump between the symbol 962 and the symbol 972. By estimating the phase jump, the receiving device may remove the phase jump to generate a copy of a signal at the symbol 962. The receiving device may then use the signal of the symbol 962 and the copy of the signal with phase jump removed to perform joint channel estimation, such as DMRS bundling.

For example, if the first CPE experienced at the symbol 962 and the second CPE experienced at the symbol 972 are similar, then Equation 7 (below) may be used to estimate the phase jump.

$$\frac{e^{j*CPE_1}*A}{e^{j*CPE_2}*e^{j*phase\_jump}*A}=e^{-j*phase\_jump} \qquad \text{Equation 7}$$

Additionally, and as described above, the CPE experienced at two symbols may be similar when the two symbols are neighboring symbols. Based on Equation 5 and Equation 6, if the CPE is the same at the two symbols, then the difference in phase error between the second phase error 974 determined at the symbol 972 and the first phase error 964 may be attributed to phase jump. Thus, aspects disclosed herein provide techniques for performing DMRS bundling over a first slot and a second slot that are a threshold quantity of slots apart (e.g., n slots in the example of FIG. 6) and using a first symbol of the first slot and a second symbol of the second slot that are associated with a similar CPE to estimate the phase jump.

Figure 10:
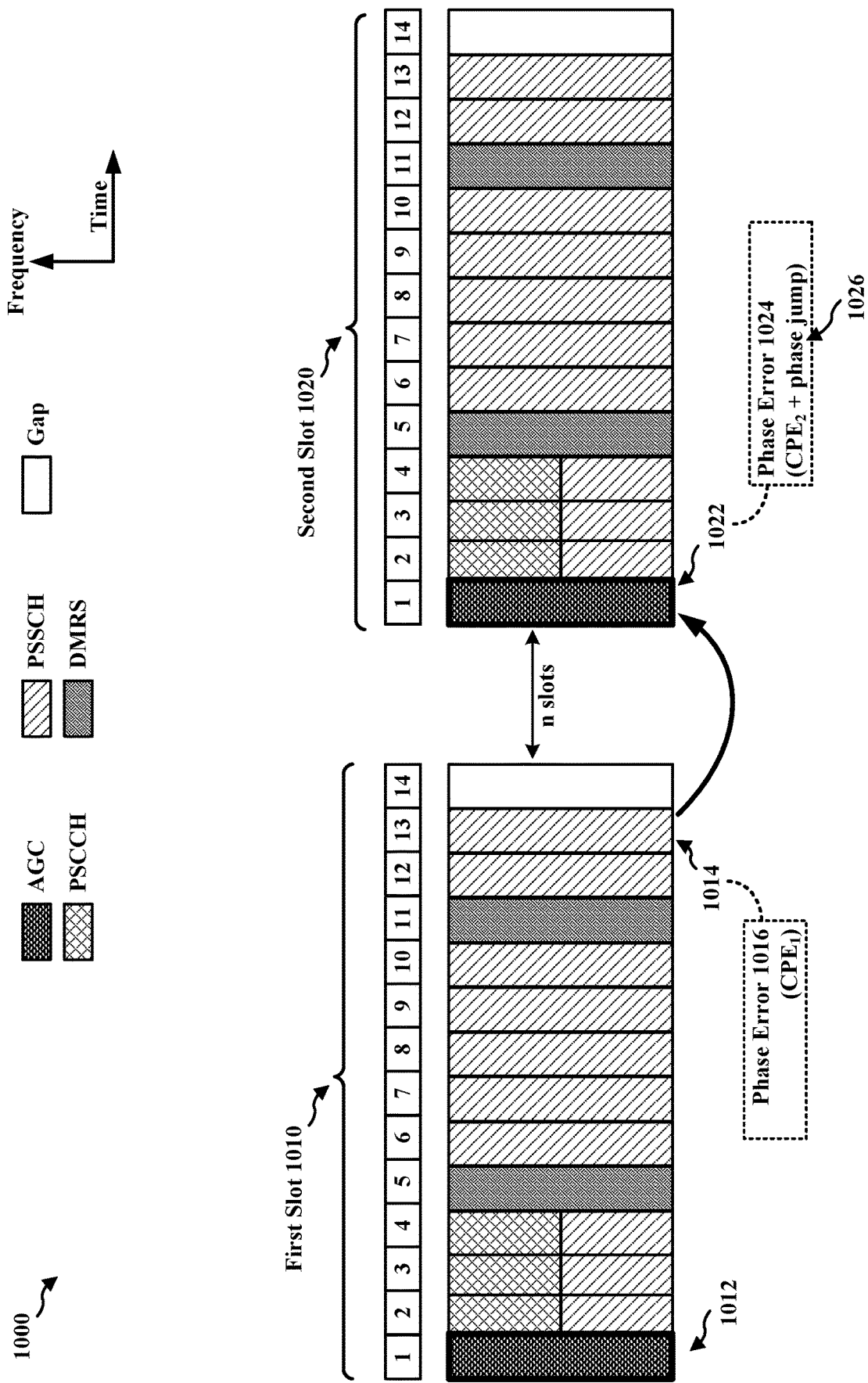
FIG. 10 illustrates an example of phase jump estimation using an automatic gain control symbol, in accordance with aspects presented herein.

FIG. 10 illustrates an example 1000 of phase jump estimation using an AGC symbol, as presented herein. In the illustrated example of FIG. 10, a first slot 1010 and a second slot 1020 are separated by less than a threshold quantity of slots. For example, the first slot 1010 and the second slot 1020 may be back-to-back slots (e.g., n=0 between the slots 1010, 1020). As shown in FIG. 10, the first slot 1010 and the second slot 1020 include an AGC symbol 1012, 1022, respectively, that each include AGC. The AGC symbols 1012, 1022 facilitate a receiving device to adjust the gain of the receiver amplifier to fit the total power of the received signal for the slot. The total power of the received signal may include the power associated with the transmission and interference (e.g., due to neighboring devices).

In the illustrated example of FIG. 10, an AGC setting of a first AGC symbol 1012 and an AGC setting of a second AGC symbol 1022 may be a same AGC setting, such as a same low noise amplifier (LNA) gain. However, the content of the second AGC symbol 1022 may be different than the content of the first AGC symbol 1012. For example, in the example of FIG. 10, the second AGC symbol 1022 may include a copy of a last PSSCH symbol 1014 of the first slot 1010. That is, the second AGC symbol 1022 may be a repetition of the last PSSCH symbol 1014. In such examples, the last PSSCH symbol 1014 and the second AGC symbol 1022 may be used to estimate the phase jump in the second slot 1020. For example, the last PSSCH symbol 1014 may be associated with a first phase error 1016 and the second AGC symbol 1022 may be associated with a second phase error 1024. Similar to the example of FIG. 9B, the first phase error 1016 may include a first CPE ("CPE1") and the second phase error 1024 may include a second CPE ("CPE2") and a phase jump 1026.

In some examples, when the first slot 1010 and the second slot 1020 are separated by less than a threshold quantity of slots, the first CPE of the last PSSCH symbol 1014 and the second CPE of the second AGC symbol 1022 may be similar. In such examples, the receiving device may use Equation 7 (above) to estimate the phase jump 1026. The receiving device may then use the estimate of the phase jump 1026 to remove it from the signal received in the DMRS symbols of the second slot 1020 and to generate a copy of the signal received in the DMRS symbols of the first slot 1010. The receiving device may use the signal received in the DMRS symbols of the first slot 1010 and the copy of the signal to perform joint channel estimation, such as DMRS bundling, as described in connection with the example second scenario 720 of FIG. 7C.

Figure 11:
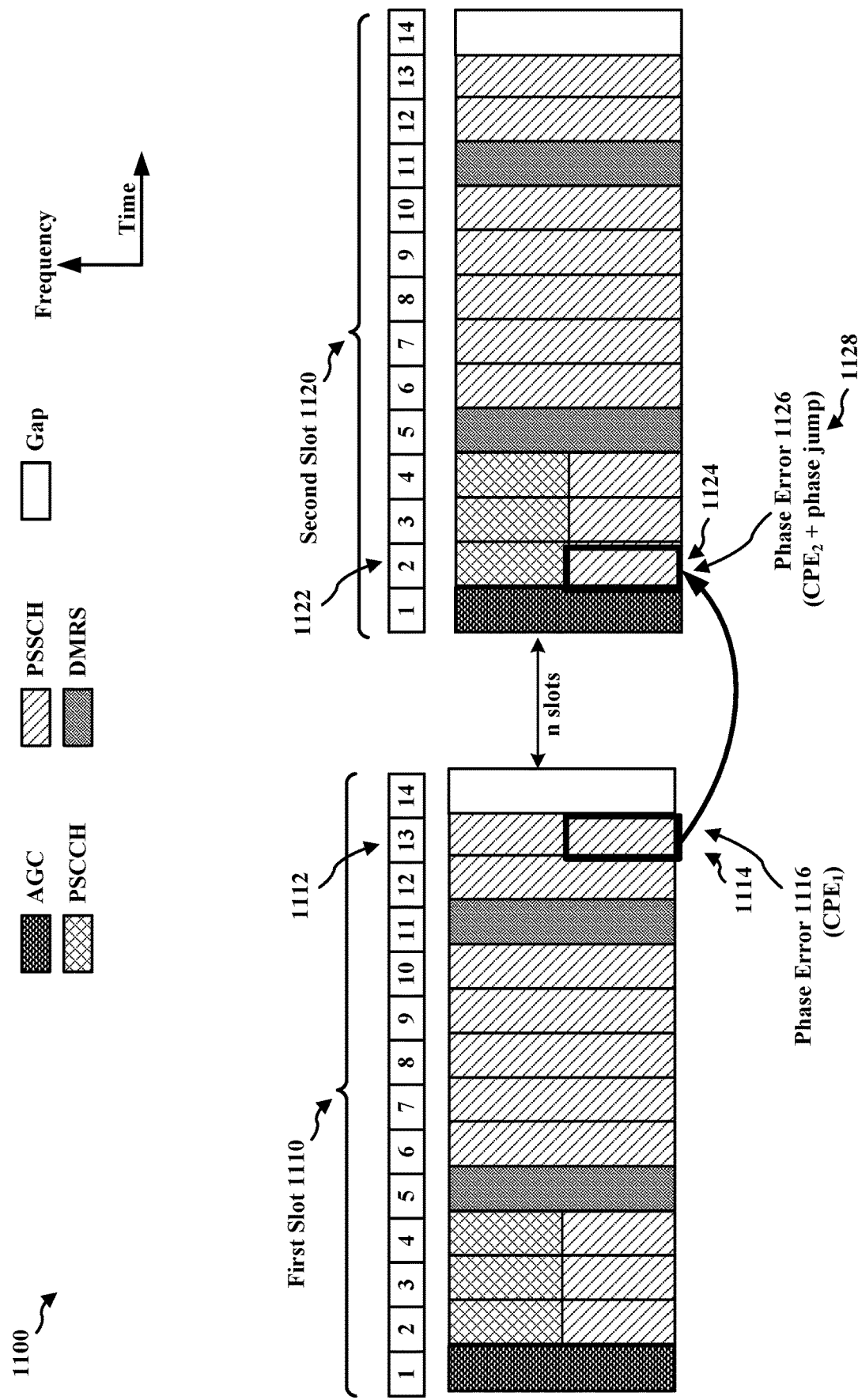
FIG. 11 illustrates an example of phase jump estimation using a last data symbol of a preceding slot, in accordance with aspects presented herein.

FIG. 11 illustrates an example 1100 of phase jump estimation using a last PSSCH symbol of a preceding slot, as presented herein. Similar to the example of FIG. 10, in the illustrated example of FIG. 11, a first slot 1110 and a second slot 1120 are separated by less than a threshold quantity of slots. For example, the first slot 1110 and the second slot 1120 may be back-to-back slots (e.g., n=0 between the slots 1110, 1120). In the illustrated example of FIG. 11, a portion of a symbol of the first slot 1110 may be repeated in a portion of a symbol of the second slot 1120. In such examples, the portion of the symbol of the second slot 1120 may be used to estimate the phase jump from the first slot 1110 to the second slot 1120.

For example, in the illustrated example of FIG. 11, a last PSSCH symbol 1112 (e.g., symbol 13) of the first slot 1110 is a PSSCH symbol. In such examples, a portion 1114 of the last PSSCH symbol 1112 may be repeated in a PSSCH portion of a symbol of the second slot 1120. For example, the portion 1114 may be repeated in a PSSCH portion 1124 of a first non-AGC symbol 1122 (e.g., a symbol 2) of the second slot 1120. In some examples, the first non-AGC symbol 1122 may be referred to as a first OFDM symbol. Similar to the example of FIG. 10, the last PSSCH symbol 1112 may be associated with a first phase error 1116 and the first non-AGC symbol 1122 may be associated with a second phase error 1126. Similar to the example of FIG. 10, the first phase error 1116 may include a first CPE ("CPE1") and the second phase error 1126 may include a second CPE ("CPE2") and a phase jump 1128.

In some examples, when the first slot 1110 and the second slot 1120 are separated by less than a threshold quantity of slots, the first CPE of the last PSSCH symbol 1112 of the first slot 1110 and the second CPE of the first non-AGC symbol 1122 of the second slot 1120 may be similar. In such examples, the receiving device may use Equation 7 (above) to estimate the phase jump 1128. The receiving device may then use the estimate of the phase jump 1128 to remove it from the signal received at every non-AGC symbol in the second slot 1120, including symbols containing DMRS, and to generate a copy of the DMRS signal received in the DMRS symbols of the first slot 1110. The receiving device may use the DMRS signal received in DMRS symbols in the first slot 1110 and the copy of the DMRS signal to perform joint channel estimation, such as DMRS bundling, as described in connection with the example second scenario 720 of FIG. 7C.

Figure 12:
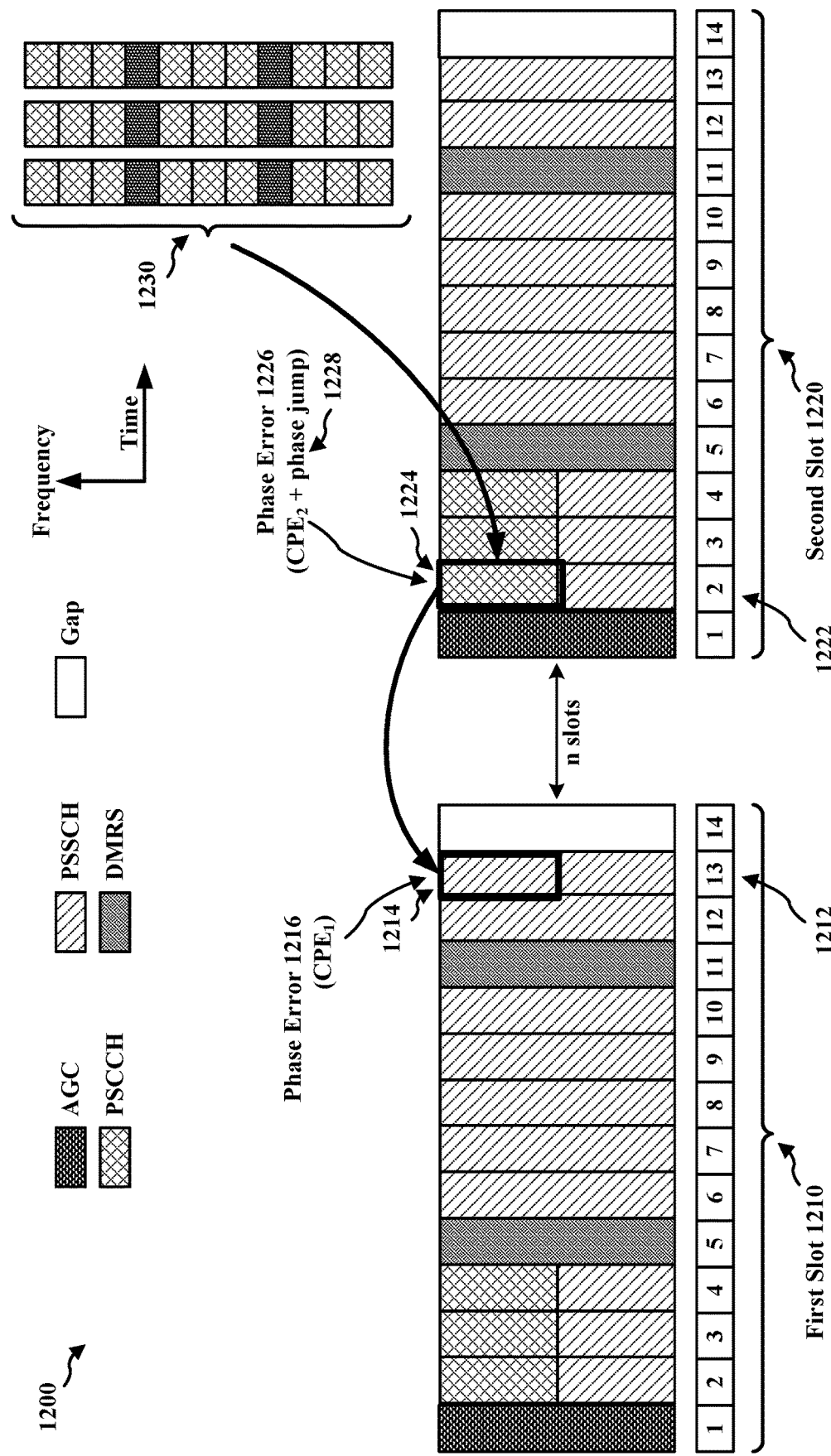
FIG. 12 illustrates an example of phase jump estimation using control DMRS, in accordance with aspects presented herein.

FIG. 12 illustrates an example 1200 of phase jump estimation using PSCCH DMRS, as presented herein. Similar to the example of FIGS. 10 and 11, in the illustrated example of FIG. 12, a first slot 1210 and a second slot 1220 are separated by less than a threshold quantity of slots. For example, the first slot 1210 and the second slot 1220 may be back-to-back slots (e.g., n=0 between the slots 1210, 1220). In the illustrated example of FIG. 12, a portion of a symbol of the second slot 1220 may be a repetition of a portion of a symbol of the first slot 1210. In such examples, the portion of the symbol of the second slot 1220 may be used to estimate the phase jump from the first slot 1210 to the second slot 1220.

For example, in the illustrated example of FIG. 12, a portion 1214 of a last PSSCH symbol 1212 of the first slot 1210 may be repeated in a PSCCH portion 1224 of a first non-AGC symbol 1222 of the second slot 1220. For example, the portion 1214 may be repeated in the PSCCH portion 1224 of the first non-AGC symbol 1222 (e.g., a symbol 2) of the second slot 1220. As shown in FIG. 12, the PSCCH portion 1224 may include a DMRS pattern 1230. A transmitting device may include the DMRS pattern 1230 in the portion 1214 so that the PSCCH portion 1224 is a repeat of the portion 1214. Similar to the examples of FIGS. 10 and 11, the last PSSCH symbol 1212 may be associated with a first phase error 1216 and the first non-AGC symbol 1222 may be associated with a second phase error 1226. Similar to the examples of FIGS. 10 and 11, the first phase error 1216 may include a first CPE ("CPE1") and the second phase error 1226 may include a second CPE ("CPE2") and a phase jump 1228.

In some examples, when the first slot 1210 and the second slot 1220 are separated by less than a threshold quantity of slots, the first CPE of the last PSSCH symbol 1212 of the first slot 1210 and the second CPE of the first non-AGC symbol 1222 of the second slot 1220 may be similar. In such examples, the receiving device may use Equation 7 (above) to estimate the phase jump 1228. The receiving device may then use the estimate of the phase jump 1228 to remove it from the signal received at every non-AGC symbol of the second slot 1220, including symbols containing DMRS, and to generate a copy of the DMRS signal received in the DMRS symbols of the first slot 1210. The receiving device may use the DMRS signal received in the DMRS symbols in the first slot 1210 and the copy of the DMRS signal to perform joint channel estimation, such as DMRS bundling, as described in connection with the example second scenario 720 of FIG. 7C.

Figure 13:
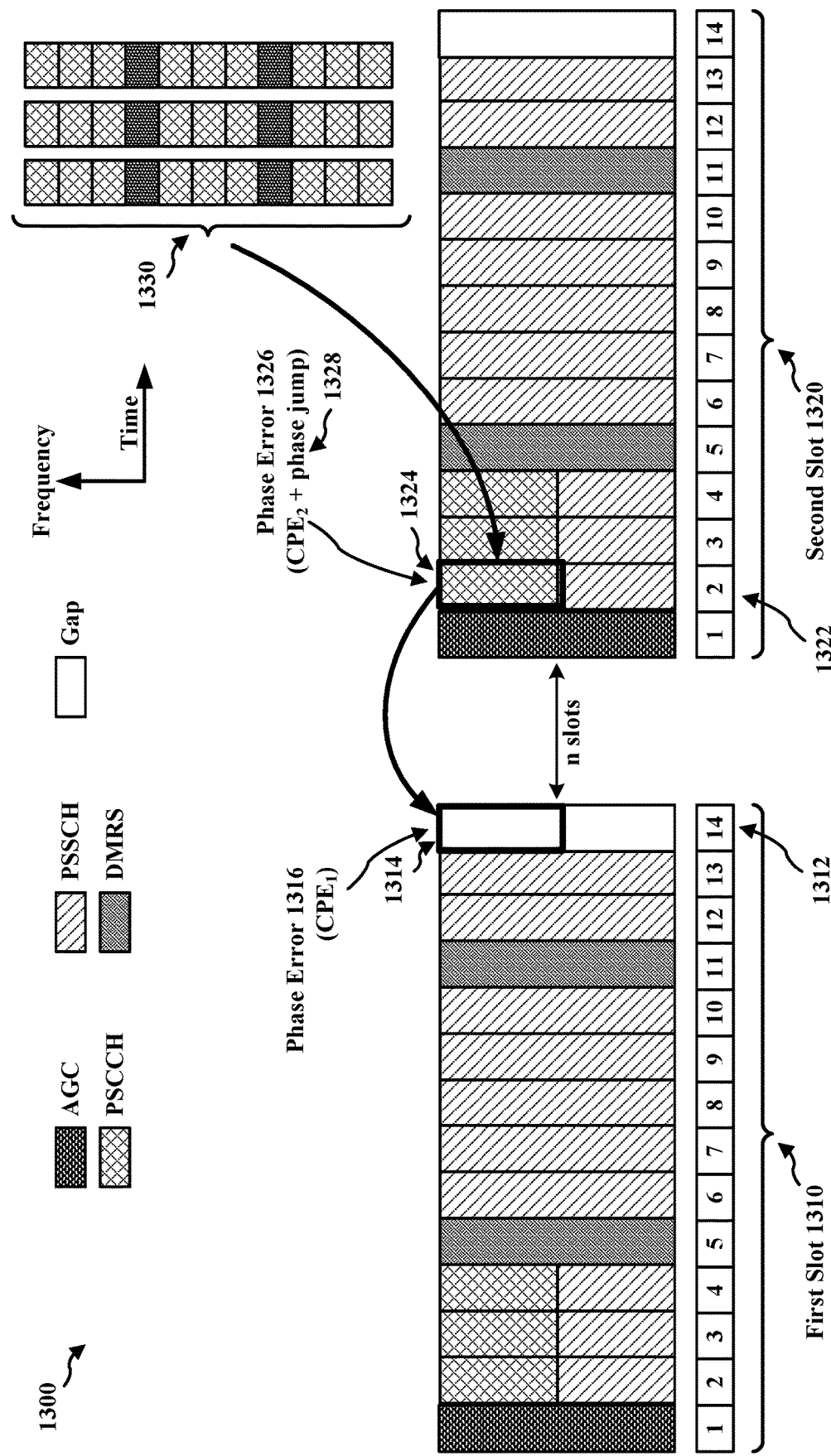
FIG. 13 illustrates another example of phase jump estimation using control DMRS, in accordance with aspects presented herein.

FIG. 13 illustrates another example 1300 of phase jump estimation using PSCCH DMRS, as presented herein. Similar to the example of FIGS. 10, 11, and 12, in the illustrated example of FIG. 13, a first slot 1310 and a second slot 1320 are separated by less than a threshold quantity of slots. For example, the first slot 1310 and the second slot 1320 may be back-to-back slots (e.g., n=0 between the slots 1310, 1320).

In the illustrated example of FIG. 13, the first slot 1310 includes a guard symbol 1312 that includes a gap. The guard symbol 1312 provides a switching time to allow a receiving device to facilitate switching between sidelink transmission/reception (and vice versa), and to facilitate switching between sidelink and downlink/uplink transmissions (and vice versa). For example, a receiving device may use a first beam to receive the first slot 1310 and use the guard symbol 1312 to switch to a second beam to transmit the second slot 1320.

However, in scenarios in which there is no switch from a first beam to a second beam, providing a switching time may be avoided. That is, the guard symbol 1312 may be used to include information. In the illustrated example of FIG. 13, a portion of a symbol of the second slot 1320 may be a repetition of a portion of a symbol of the first slot 1310. In such examples, the portion of the symbol of the second slot 1320 may be used to estimate the phase jump from the first slot 1310 to the second slot 1320.

For example, in the illustrated example of FIG. 13, the guard symbol 1312 may include a portion of a first non-AGC symbol 1322 of the second slot 1320. In the illustrated example, a PSCCH portion 1324 of the first non-AGC symbol 1322 (e.g., symbol 2) is also transmitted in a portion 1314 of the guard symbol 1312. Similar to the example of FIG. 12, the PSCCH portion 1324 of FIG. 13 may include a DMRS pattern 1330. A transmitting device may include the DMRS pattern 1330 in the portion 1314 of the guard symbol 1312 so that the PSCCH portion 1324 is a repetition of the portion 1314. Similar to the examples of FIGS. 10, 11, and 12, the guard symbol 1312 may be associated with a first phase error 1316 and the first non-AGC symbol 1322 may be associated with a second phase error 1326. Similar to the examples of FIGS. 10, 11, and 12, the first phase error 1316 may include a first CPE ("CPE1") and the second phase error 1326 may include a second CPE ("CPE2") and a phase jump 1328.

In some examples, when the first slot 1310 and the second slot 1320 are separated by less than a threshold quantity of slots, the first CPE of the guard symbol 1312 of the first slot 1310 and the second CPE of the first non-AGC symbol 1322 of the second slot 1320 may be similar. In such examples, the receiving device may use Equation 7 (above) to estimate the phase jump 1328. The receiving device may then use the estimate of the phase jump 1328 to remove it from the signal in the second slot 1320 and to generate a copy of the DMRS signal received in the first slot 1310. The receiving device may use the DMRS signal received in the first slot 1310 and the copy of the DMRS signal to perform joint channel estimation, such as DMRS bundling, as described in connection with the example second scenario 720 of FIG. 7C.

Figure 14:
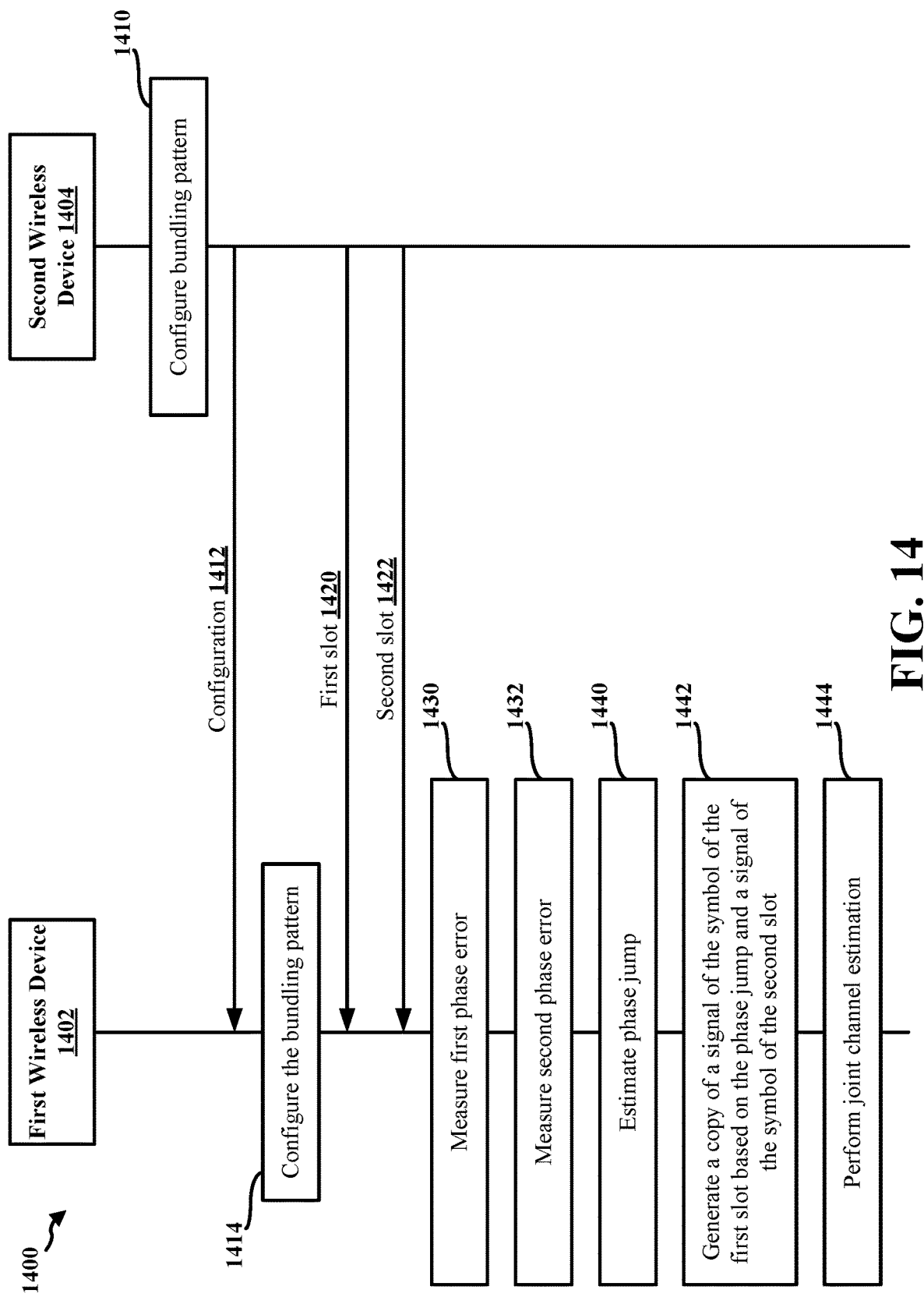
FIG. 14 is an example communication flow between a first wireless device and a second wireless device, in accordance with the teachings disclosed herein.

FIG. 14 illustrates an example communication flow 1400 between a first wireless device 1402 and a second wireless device 1404, as presented herein. In the illustrated example, the communication flow 1400 facilitates the first wireless device 1402 to perform phase jump estimation to facilitate DMRS bundling. Aspects of the first wireless device 1402 and the second wireless device 1404 may be implemented by the UE 104 of FIG. 1, the first wireless communication device 310 of FIG. 3, and/or the second wireless communication device 350 of FIG. 3. Although not shown in the illustrated example of FIG. 14, in additional or alternative examples, the first wireless device 1402 may be in communication with one or more other base stations or UEs, and/or the second wireless device 1404 may be in communication with one or more other base stations or UEs.

In some examples, the first wireless device 1402 and the second wireless device 1404 may include UEs with the capability to support sidelink communication. For example, the first wireless device 1402 may include a first sidelink device and the second wireless device 1404 may include a second sidelink device. In some examples, one of the first wireless device 1402 and the second wireless device 1404 may include a base station and the other of the first wireless device 1402 and the second wireless device 1404 may include a UE. For example, the first wireless device 1402 may include a base station, the second wireless device 1404 may include a UE, and communication from the second wireless device 1404 to the first wireless device 1402 may include an uplink transmission. In other examples, the first wireless device 1402 may include a UE, the second wireless device 1404 may include a base station, and communication from the second wireless device 1404 to the first wireless device 1402 may include a downlink transmission.

In the illustrated example of FIG. 14, the first wireless device 1402 is a receiving UE that receives transport block(s) from the second wireless device 1404 (e.g. a transmitting UE). For example, the second wireless device 1404 may transmit a first slot 1420 and a second slot 1422 that are received by the first wireless device 1402. The first slot 1420 and the second slot 1422 may be part of a same transmission from the second wireless device 1404 to the first wireless device 1402. The first slot 1420 and the second slot 1422 may be included in a sidelink DMRS bundling window, such as the example sidelink DMRS bundling window 600 of FIG. 6. For example, the first slot 1420 and the second slot 1422 may be separated by n slots. In some examples, the first slot 1420 and the second slot 1422 may be consecutive slots (e.g., n=0 slots).

Aspects of the first slot 1420 may be implemented by the first slot 610 of FIG. 6, the first slot 702 of FIGS. 7A, 7B, and 7C, the first slot 960 of FIG. 9B, the first slot 1010 of FIG. 10, the first slot 1110 of FIG. 11, the first slot 1210 of FIG. 12, and/or the first slot 1310 of FIG. 13. Aspects of the second slot 1422 may be implemented by the second slot 620 of FIG. 6, the second slot 704 of FIGS. 7A, 7B, and 7C, the second slot 970 of FIG. 9B, the second slot 1020 of FIG. 10, the second slot 1120 of FIG. 11, the second slot 1220 of FIG. 12, and/or the second slot 1320 of FIG. 13.

At 1430, the first wireless device 1402 measures a first phase error for a symbol of the first slot 1420. At 1432, the first wireless device 1402 measures a second phase error for a symbol of the second slot 1422. The first phase error and the second phase error may include a respective common phase error (CPE) that is applied to each tone of a symbol. For example, the CPE of a symbol may cause the tones of the symbol to rotate with respective to a constellation. In some examples, the rotation of the tones may cause stretching and/or shrinking of the points to a constellation, as described in connection with FIG. 8.

While the CPE is time-varying, the CPE is also relatively slowly time-varying. For example, the CPE of a first symbol may be similar to the CPE of a second symbol that is adjacent to the first symbol. Accordingly, when the first slot 1420 and the second slot 1422 are less than a threshold quantity of slots apart, the symbol associated with the first phase error (e.g., at 1430) and the symbol associated with the second phase error (e.g., at 1432) may have similar CPE values. In such examples, the difference between the second phase error and the first phase error may correspond to a phase jump between the first slot 1420 and the second slot 1422.

At 1440, the first wireless device 1402 may estimate a phase jump based on the first phase error and the second phase error. For example, the first wireless device 1402 may apply Equation 7 (reproduced below) to estimate the phase jump.

$$\frac{e^{j*cPE_1} * A}{e^{j*CPE_2} * e^{j*phase\_jump} * A} = e^{-j*phase\_jump} \qquad \text{Equation 7}$$

At 1442, the first wireless device 1402 may generate a copy of a signal of the symbol of the first slot 1420 based on the estimated phase jump and a signal of the symbol of the second slot 1422. For example, and referring to the example of FIG. 7C, the first wireless device 1402 may modify the second slot DMRS signal 724 based on the phase jump 726 to generate the generated DMRS signal 728 that is a copy of the first slot DMRS signal 722.

In some examples, the first wireless device 1402 may generate a signal that is a copy of the signal of the symbol of the first slot 1420 based on modifying the phases of the respective signals. For example, the first wireless device 1402 may modify the second phase error associated with the symbol of the second slot 1422 based on the phase jump. As described above, the information of the symbol of the second slot 1422 and the information of the symbol of the first slot 1420 are copies. As a result, the signals at the respective symbols are expected to be copies, as described in connection with the example first scenario 710 of FIG. 7B. However, due to the phase jump between the first slot 1420 and the second slot 1422, the signal of the second slot 1422 may be offset from the signal of the first slot 1420 by the value of the phase jump. Thus, the first wireless device 1402 may modify the signal of the second slot 1422 based on the phase jump to reproduce the signal of the first slot 1420.

At 1444, the second wireless device 1444 may perform joint channel estimation, such as DMRS bundling. For example, the second wireless device 1444 may perform coherent combining of the DMRS signal of the symbol of the first slot 1420 and the generated copy of the DMRS signal. Combining the signal across the first slot 1420 and the second slot 1422 may improve the channel condition estimation. By accurately estimating channel conditions, a higher MCS may be selected for transmissions, which may increase throughput.

Although the above example of FIG. 14 describes using phase jump estimation to perform DMRS bundling, it may be appreciated that in other examples, the phase jump estimation may be used to perform additional or alternative joint channel estimations.

In some examples, at least a portion of the symbol of the first slot 1420 and a portion of the symbol of the second slot 1422 may be copies. For example, in a first scenario, the second wireless device 1404 may repeat the last data symbol of the first slot 1420 in an AGC symbol of the second slot 1422. For example, and referring to the example of FIG. 10, a transmitting device may copy the last PSSCH symbol 1014 of the first slot 1010 into the second AGC symbol 1022 of the second slot 1020. In some such examples, the CPE associated with the last PSSCH symbol 1014 and the second AGC symbol 1022 may be similar. The first wireless device 1402 may then use the difference in phase error of the last PSSCH symbol 1014 and the second AGC symbol 1022 may be used to estimate the phase jump (e.g., at 1440).

In an example second scenario, the second wireless device 1404 may repeat a portion of the last data symbol of the first slot 1420 in a portion of a symbol of the second slot 1422. For example, and referring to the example of FIG. 11, a transmitting device may copy the portion 1114 of the last PSSCH symbol 1112 of the first slot 1110 into the PSSCH portion 1124 of the first non-AGC symbol 1122 of the second slot 1120. In some such examples, the CPE associated with the portion 1114 and the PSSCH portion 1124 may be similar. The first wireless device 1402 may then use the difference in phase error of the portion 1114 and the PSSCH portion 1124 may be used to estimate the phase jump (e.g., at 1440).

In an example third scenario, the second wireless device 1404 may repeat a portion of control information of a symbol of the second slot 1422 in a portion of the last data symbol of the first slot 1420 so that the control information of the symbol of the second slot 1422 is a repetition of the portion of the last data symbol of the first slot 1420. For example, and referring to the example of FIG. 12, a transmitting device may copy the PSCCH portion 1224 of the first non-AGC symbol 1222 of the second slot 1220 into the portion 1214 of the last PSSCH symbol 1212 before transmitting the first slot 1210. In some such examples, the CPE associated with the portion 1214 and the PSCCH portion 1224 may be similar. The first wireless device 1402 may then use the difference in phase error of the portion 1214 and the PSCCH portion 1224 to estimate the phase jump (e.g., at 1440).

In an example fourth scenario, the second wireless device 1404 may repeat control information of a symbol of the second slot 1422 in a guard symbol of the first slot 1420. For example, and referring to the example of FIG. 13, a transmitting device may copy the PSCCH portion 1324 of the first non-AGC symbol 1322 into the portion 1314 of the guard symbol 1312 of the first slot 1310. In some such examples, the CPE associated with the portion 1314 and the PSCCH portion 1324 may be similar. The first wireless device 1402 may then use the difference in phase error of the portion 1314 and the PSCCH portion 1324 to estimate the phase jump (e.g., at 1440).

In some examples, the second wireless device 1404 may configure the first wireless device 1402 with a bundling pattern to facilitate the first wireless device 1402 to determine which symbols of the first slot 1420 and the second slot 1422 to use to estimate the phase jump. For example, at 1410, the second wireless device 1404 may configure a bundling pattern by determining which portion of a symbol of the first slot 1420 to repeat in a portion of a symbol of the second slot 1422. For example, in the example first scenario of FIG. 10, the second wireless device 1404 may determine to copy the last PSSCH symbol of the first slot into the AGC symbol of the second slot. In the example second scenario of FIG. 11, the second wireless device 1404 may determine to copy a portion of the last PSSCH symbol of the first slot into a PSSCH portion of the first non-AGC symbol of the second slot. In the example third scenario of FIG. 12, the second wireless device 1404 may determine to copy control information of the first non-AGC symbol of the second slot into a portion of the last PSSCH symbol of the first slot. In the example fourth scenario, the second wireless device 1404 may determine to copy control information of the first non-AGC symbol of the second slot into a portion of the guard symbol of the first slot.

The second wireless device 1404 may then transmit a configuration 1412 that is received by the first wireless device 1402. The configuration 1412 may indicate the symbols that the first wireless device 1402 is to use to estimate the phase jump. At 1414, the first wireless device 1402 may configure the bundling pattern based on the configuration 1412. For example, the first wireless device 1402 may be configured to assume that the same precoder is used by the second wireless device 1404 across the data channels of the first slot 1420 and the second slot 1422. The second wireless device 1404 may transmit the first slot 1420 and the second slot 1422 based on the determined bundling pattern (e.g., at 1410).

Figure 15:
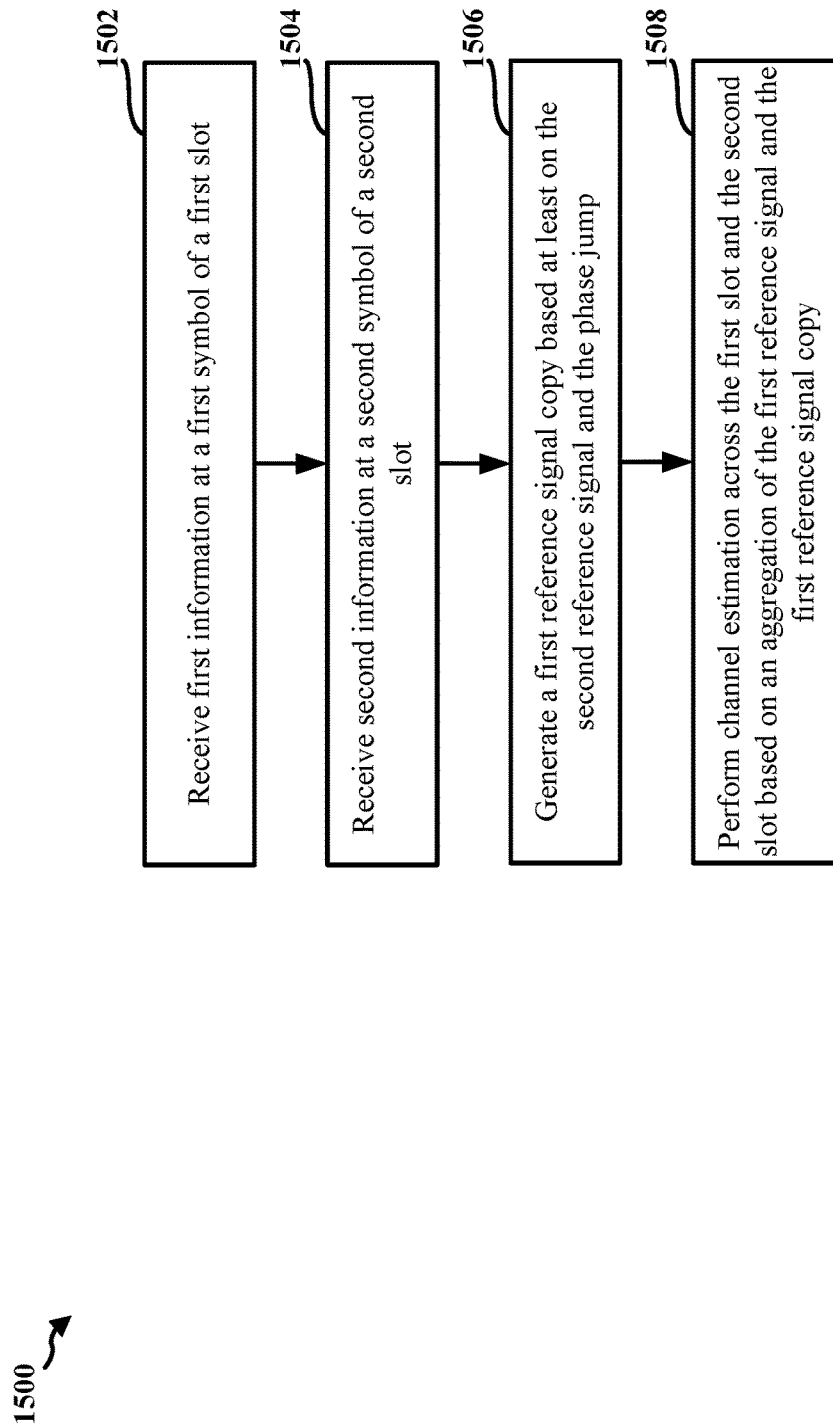
FIG. 15 is a flowchart of a method of wireless communication at a first wireless device, in accordance with aspects presented herein.

FIG. 15 is a flowchart 1500 of a method of wireless communication. The method may be performed by a first wireless device (e.g., the UE 104, the second wireless communication device 350, and/or an apparatus 1702 of FIG. 17). The method may facilitate improving throughput by enabling the first wireless device to improve channel estimation and to communicate with a second wireless device using a high MCS.

In some examples, the first wireless device may include a first sidelink device and the second wireless device may include a second sidelink device. In some examples, the first wireless device may include a base station and the second wireless device may include a UE. In some examples, the first wireless device may include a UE and the second wireless device may include a base station.

At 1502, the first wireless device receives, from a second wireless device, first information at a first symbol of a first slot, as described in connection with the first slot 1420 of FIG. 14. The first slot may include at least the first symbol and a first reference signal. The receiving of the first slot, at 1502, may be performed by a first slot component 1740 of the apparatus 1702 of FIG. 17.

At 1504, the first wireless device receives second information at a second symbol of a second slot, as described in connection with the second slot 1422 of FIG. 14. The second slot may include at least the second symbol and a second reference signal. The first information and the second information may be copies. The receiving of the second slot, at 1504, may be performed by a second slot component 1742 of the apparatus 1702 of FIG. 17.

At 1506, the first wireless device generates a first reference signal copy based at least on the second reference signal and a phase jump, as described in connection with 1442 of FIG. 14. For example, the first wireless device may modify a phase of the second reference signal based on the phase jump to generate the first reference signal copy, as described in connection with the example second scenario 720 of FIG. 7C. The phase jump may be based on a first phase error associated with the first symbol and a second phase error associated with the second symbol. The generating of the first reference signal copy, at 1506, may be performed by a signal component 1746 of the apparatus 1702 of FIG. 17.

At 1508, the first wireless device performs channel estimation across the first slot and the second slot based on an aggregation of the first reference signal and the first reference signal copy, as described in connection with 1444 of FIG. 14. In some examples, the first wireless device may perform channel estimation based on an aggregation of the first reference signal and the first reference signal copy. The performing of the DMRS bundling, at 1508, may be performed by a channel estimation component 1748 of the apparatus 1702 of FIG. 17.

In some examples, the second information may be a copy of the first information. For example, in the example first scenario of FIG. 10, the first symbol of the first slot may include a last data symbol (e.g., the last PSSCH symbol 1014) and the second symbol of the second slot may include an AGC symbol (e.g., the second AGC symbol 1022). In such examples, the second information of the second slot may be a copy of the first information of the first slot.

In some examples, the first information and the second information may include portions of the respective symbols. For example, in the example second scenario of FIG. 11, the first symbol of the first slot includes a last data symbol (e.g., the last PSSCH symbol 1112) and the second symbol of the second slot includes a first non-AGC symbol (e.g., the first non-AGC symbol 1122). In such examples, the second information may include a data portion of the second symbol (e.g., the PSSCH portion 1124), the first information may include a portion of the first symbol (e.g., the portion 1114), and the second information may be a copy of the first information.

In an example third scenario of FIG. 12, the first symbol of the first slot may include a last data symbol (e.g., the last PSSCH symbol 1212) and the second symbol of the second slot may include a first non-AGC symbol (e.g., the first non-AGC symbol 1222). In such examples, the second information may include a control portion of the second symbol (e.g., the PSCCH portion 1224), the first information may include a portion of the first symbol (e.g., portion 1214), and the first information may be a copy of the second information.

In an example fourth scenario of FIG. 13, the first symbol of the first slot may include a guard symbol (e.g., the guard symbol 1312) and the second symbol of the second slot may include a first non-AGC symbol (e.g., first non-AGC symbol 1322). In such examples, the second information may include a control portion of the second symbol (e.g., the PSCCH portion 1324), the first information may include a portion of the first symbol (e.g., the portion 1314), and the first information may be a copy of the second information.

Figure 16:
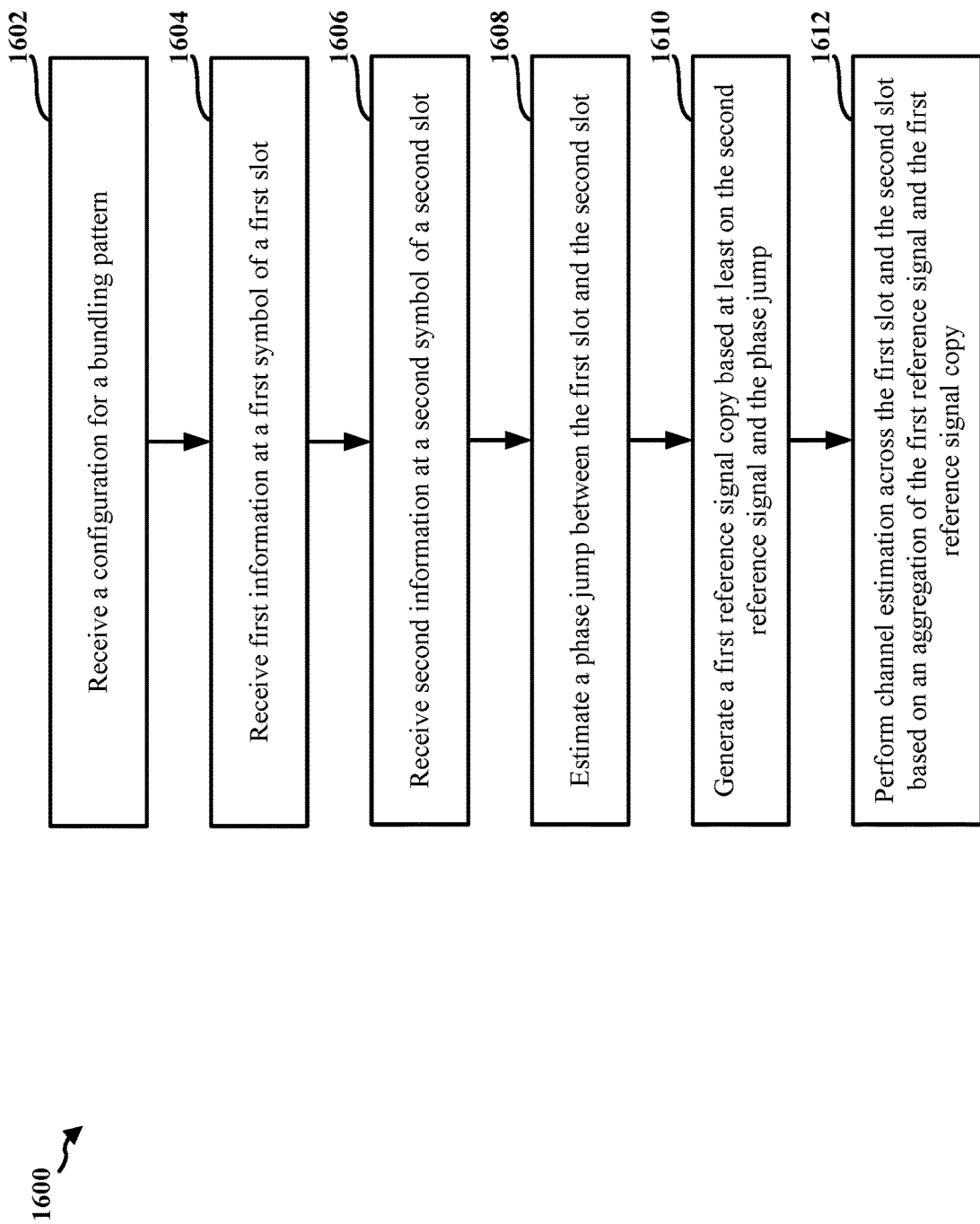
FIG. 16 is a flowchart of another method of wireless communication at a first wireless device, in accordance with aspects presented herein.

FIG. 16 is a flowchart 1600 of a method of wireless communication. The method may be performed by a first wireless device (e.g., the UE 104, the second wireless communication device 350, and/or an apparatus 1702 of FIG. 17). The method may facilitate improving throughput by enabling the first wireless device to improve channel estimation and to communicate with a second wireless device using a high MCS.

In some examples, the first wireless device may include a first sidelink device and the second wireless device may include a second sidelink device. In some examples, the first wireless device may include a base station and the second wireless device may include a UE. In some examples, the first wireless device may include a UE and the second wireless device may include a base station.

At 1604, the first wireless device receives, from a second wireless device, first information at a first symbol of a first slot, as described in connection with the first slot 1420 of FIG. 14. The first slot may include at least the first symbol and a first reference signal. The receiving of the first slot, at 1604, may be performed by a first slot component 1740 of the apparatus 1702 of FIG. 17.

At 1606, the first wireless device receives second information at a second symbol of a second slot, as described in connection with the second slot 1422 of FIG. 14. The second slot may include at least the second symbol and a second reference signal. The first information and the second information may be copies. The receiving of the second slot, at 1606, may be performed by a second slot component 1742 of the apparatus 1702 of FIG. 17.

In some examples, the first slot and the second slot may be separated by a threshold quantity of slots. For example, the first slot and the second slot may be included in a bundling window, such as the example sidelink DMRS bundling window 600 of FIG. 6. In some examples, the threshold quantity of slots may be zero. In such examples, the first slot and the second slot may be consecutive slots. In some examples, the threshold quantity of slots may be greater than zero. In such examples, the first slot and the second slot may be non-consecutive slots.

At 1608, the first wireless device may estimate a phase jump between the first slot and the second slot, as described in connection with 1440 of FIG. 14. In some examples, a first CPE associated with the first slot and a second CPE associated with the second slot may be similar. For example, a last data symbol of the first slot may be associated with a first CPE, a first symbol of the second slot may be associated with a second CPE, and a difference between the first CPE and the second CPE may be less than a threshold. In such examples, the first wireless device may estimate the phase jump based on a difference between a first phase error associated with the first symbol of the first slot and a second phase error associated with the second symbol of the second slot. The estimating of the phase jump, at 1608, may be performed by a phase jump component 1744 of the apparatus 1702 of FIG. 17.

At 1610, the first wireless device generates a first reference signal copy based at least on the second reference signal and the phase jump, as described in connection with 1442 of FIG. 14. For example, the first wireless device may modify a phase of the second reference signal based on the phase jump to generate the first reference signal copy, as described in connection with the example second scenario 720 of FIG. 7C. The phase jump may be based on a first phase error associated with the first symbol and a second phase error associated with the second symbol. The generating of the first reference signal copy, at 1610, may be performed by a signal component 1746 of the apparatus 1702 of FIG. 17.

At 1612, the first wireless device performs channel estimation across the first slot and the second slot based on an aggregation of the first reference signal and the first reference signal copy, as described in connection with 1444 of FIG. 14. In some examples, the first wireless device may perform channel estimation based on an aggregation of the first reference signal and the first reference signal copy. The performing of the DMRS bundling, at 1612, may be performed by a channel estimation component 1748 of the apparatus 1702 of FIG. 17.

In some examples, the first wireless device may be configured to determine the symbols to combine to use for the channel estimation. For example, at 1602, the first wireless device may receive a configuration for a bundling pattern, as described in connection with the configuration 1412 of FIG. 14. The configuration may include a pattern indicating the first symbol of the first slot and the second symbol of the second slot. The receiving of the configuration, at 1602, may be performed by a configuration component 1750 of the apparatus 1702 of FIG. 17.

In some examples, the second information may be a copy of the first information. For example, in the example first scenario of FIG. 10, the first symbol of the first slot may include a last data symbol (e.g., the last PSSCH symbol 1014) and the second symbol of the second slot may include an AGC symbol (e.g., the second AGC symbol 1022). In such examples, the second information of the second slot may be a copy of the first information of the first slot.

In some examples, the first information and the second information may include portions of the respective symbols. For example, in the example second scenario of FIG. 11, the first symbol of the first slot includes a last data symbol (e.g., the last PSSCH symbol 1112) and the second symbol of the second slot includes a first non-AGC symbol (e.g., the first non-AGC symbol 1122). In such examples, the second information may include a data portion of the second symbol (e.g., the PSSCH portion 1124), the first information may include a portion of the first symbol (e.g., the portion 1114), and the second information may be a copy of the first information.

In an example third scenario of FIG. 12, the first symbol of the first slot may include a last data symbol (e.g., the last PSSCH symbol 1212) and the second symbol of the second slot may include a first non-AGC symbol (e.g., the first non-AGC symbol 1222). In such examples, the second information may include a control portion of the second symbol (e.g., the PSCCH portion 1224), the first information may include a portion of the first symbol (e.g., portion 1214), and the first information may be a copy of the second information.

In an example fourth scenario of FIG. 13, the first symbol of the first slot may include a guard symbol (e.g., the guard symbol 1312) and the second symbol of the second slot may include a first non-AGC symbol (e.g., first non-AGC symbol 1322). In such examples, the second information may include a control portion of the second symbol (e.g., the PSCCH portion 1324), the first information may include a portion of the first symbol (e.g., the portion 1314), and the first information may be a copy of the second information.

Figure 17:
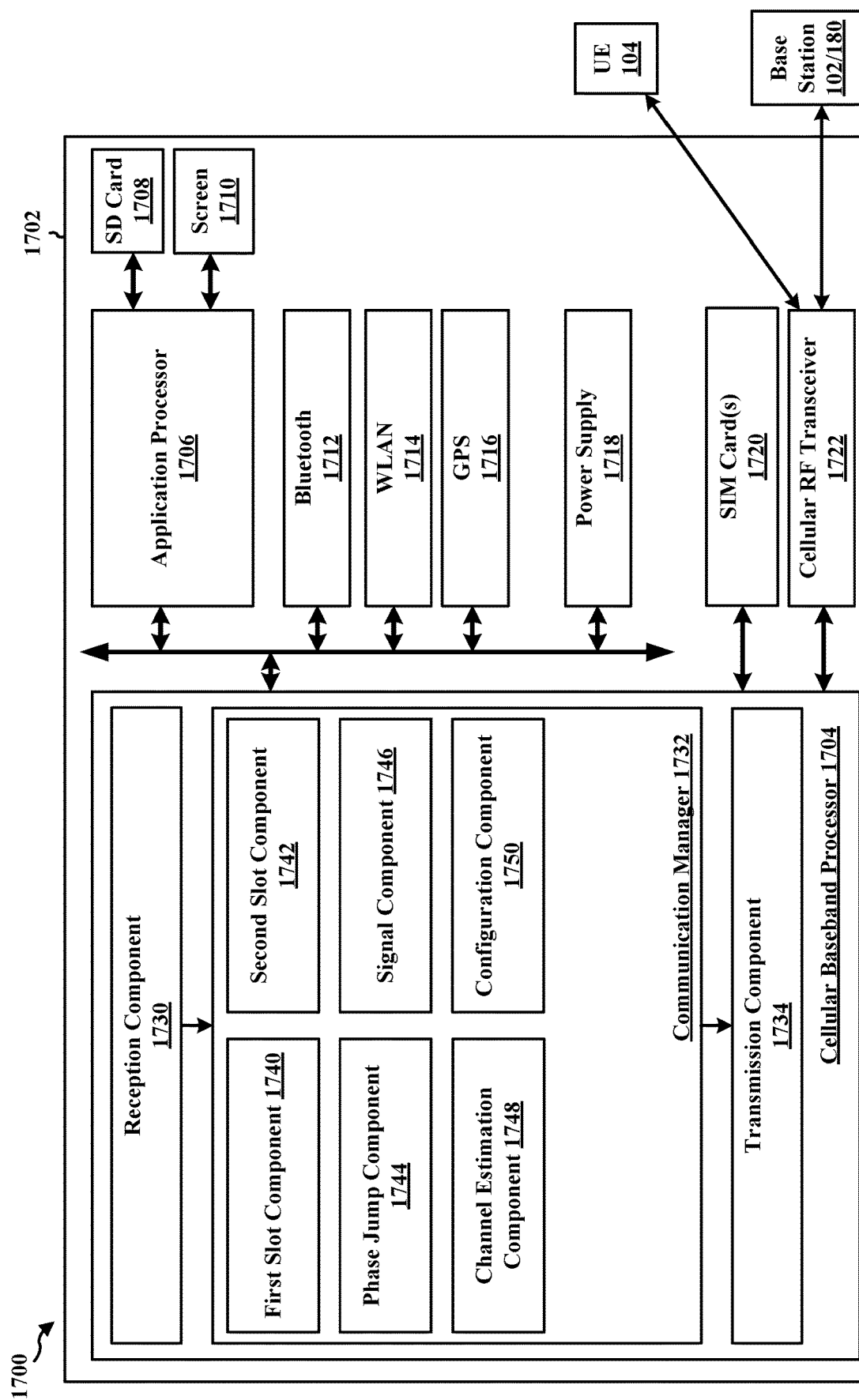
FIG. 17 is a diagram illustrating an example of a hardware implementation for an example apparatus, in accordance with aspects presented herein.

FIG. 17 is a diagram 1700 illustrating an example of a hardware implementation for an apparatus 1702. The apparatus 1702 may be a UE, or another device configured to transmit and/or receive sidelink communication. The apparatus 1702 includes a baseband processor 1704 (also referred to as a modem) coupled to a RF transceiver 1722. In some aspects, the baseband processor 1704 may be a cellular baseband processor and/or the RF transceiver 1722 may be a cellular RF transceiver. The apparatus 1702 may further include one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, and/or a power supply 1718. The baseband processor 1704 communicates through the RF transceiver 1722 with the UE 104 and/or the base station 102/180. The baseband processor 1704 may include a computer-readable medium/memory. The computer-readable medium/memory may be non-transitory. The baseband processor 1704 is responsible for general processing, including the execution of software stored on the computer-readable medium/memory. The software, when executed by the baseband processor 1704, causes the baseband processor 1704 to perform the various functions described in the present application. The computer-readable medium/memory may also be used for storing data that is manipulated by the baseband processor 1704 when executing software. The baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband processor 1704. The baseband processor 1704 may be a component of the second wireless communication device 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see the second wireless communication device 350 of FIG. 3) and include the additional modules of the apparatus 1702.

The communication manager 1732 includes a first slot component 1740 that is configured to receive, from a second wireless device, first information at a first symbol of a first slot, the first slot including at least the first symbol and a first reference signal, for example, as described in connection with 1502 of FIGS. 15 and/or 1604 of FIG. 16.

The communication manager 1732 also includes a second slot component 1742 that is configured to receive second information at a second symbol of a second slot, the second slot including at least the second symbol and a second reference signal, the first information and the second information being repetitions, for example, as described in connection with 1504 of FIGS. 15 and/or 1606 of FIG. 16.

The communication manager 1732 also includes a phase jump component 1744 that is configured to estimate a phase jump between the first slot and the second slot, for example, as described in connection with 1608 of FIG. 16.

The communication manager 1732 also includes a signal component 1746 that is configured to generate a first reference signal copy based at least on the second reference signal and a phase jump between the first slot and the second slot, the phase jump based on a first phase error associated with the first symbol and a second phase error associated with the second symbol, for example, as described in connection with 1506 of FIGS. 15 and/or 1610 of FIG. 16.

The communication manager 1732 also includes a channel estimation component 1748 that is configured to perform channel estimation across the first slot and the second slot based on an aggregation of the first reference signal and the first reference signal copy, for example, as described in connection with 1508 of FIGS. 15 and/or 1612 of FIG. 16.

The communication manager 1732 also includes a configuration component 1750 that is configured to receive a configuration for a bundling pattern, for example, as described in connection with 1602 of FIG. 16.

The apparatus may include additional components that perform each of the blocks of the algorithm in the flowcharts of FIGS. 15 and/or 16. As such, each block in the flowcharts of FIGS. 15 and/or 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the baseband processor 1704, includes means for receiving, from a second wireless device, first information at a first symbol of a first slot, the first slot including at least the first symbol and a first reference signal. The example apparatus 1702 also includes means for receiving second information at a second symbol of a second slot, the second slot including at least the second symbol and a second reference signal, the first information and the second information being repetitions. The example apparatus 1702 also includes means for generating a first reference signal copy based at least on the second reference signal and a phase jump between the first slot and the second slot, the phase jump based on a first phase error associated with the first symbol and a second phase error associated with the second symbol. The example apparatus 1702 also includes means for performing channel estimation across the first slot and the second slot based on an aggregation of the first reference signal and the first reference signal copy.

The means may be one or more of the components of the apparatus 1702 configured to perform the functions recited by the means. As described supra, the apparatus 1702 may include the TX processor 368, the RX processor 356, and the controller/processor 359. As such, in one configuration, the means may be the TX processor 368, the RX processor 356, and the controller/processor 359 configured to perform the functions recited by the means.

Figure 18:
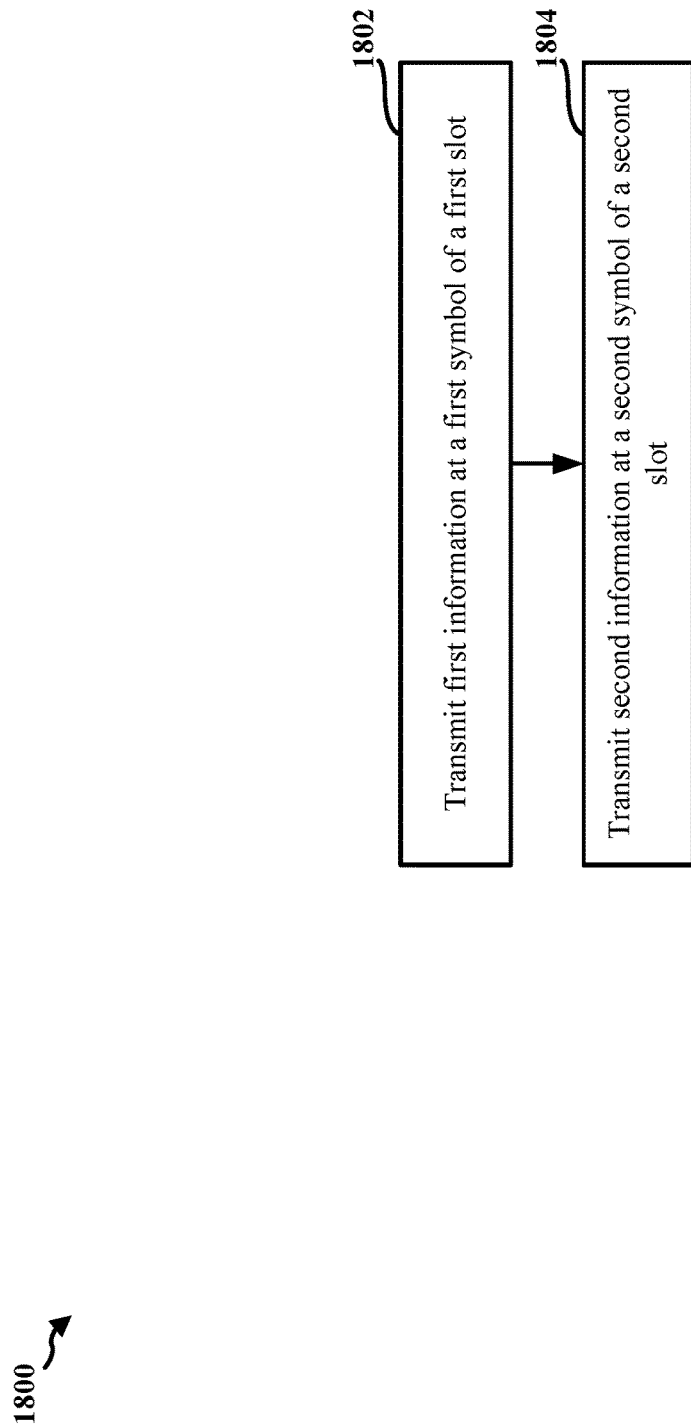
FIG. 18 is a flowchart of a method of wireless communication at a second wireless device, in accordance with aspects presented herein.

FIG. 18 is a flowchart 1800 of a method of wireless communication with a first wireless device. The method may be performed by a second wireless device (e.g., the UE 104, the first wireless communication device 310, and/or an apparatus 2002 of FIG. 20). The method may facilitate improving throughput by enabling the first wireless device to improve channel estimation and to communicate with the second wireless device using a high MCS.

In some examples, the first wireless device may include a first sidelink device and the second wireless device may include a second sidelink device. In some examples, the first wireless device may include a base station and the second wireless device may include a UE. In some examples, the first wireless device may include a UE and the second wireless device may include a base station.

At 1802, the second wireless device transmits, to the first wireless device, first information at a first symbol of a first slot, the first slot including at least the first symbol and a first reference signal, as described in connection with the first slot 1420 of FIG. 14. The transmitting of the first slot, at 1802, may be performed by a first slot component 2040 of the apparatus 2002 of FIG. 20.

At 1804, the second wireless device transmits second information at a second symbol of a second slot, the second slot including at least the second symbol and a second reference signal, the first information and the second information being repetitions, as described in connection with the second slot 1422 of FIG. 14. The transmitting of the second slot, at 1804, may be performed by a second slot component 2042 of the apparatus 2002 of FIG. 20.

In some examples, the first slot and the second slot may be separated by a threshold quantity of slots. For example, the first slot and the second slot may be included in a bundling window, such as the example sidelink DMRS bundling window 600 of FIG. 6. In some examples, the threshold quantity of slots may be zero. In such examples, the first slot and the second slot may be consecutive slots. In some examples, the threshold quantity of slots may be greater than zero. In such examples, the first slot and the second slot may be non-consecutive slots.

In some examples, a first CPE associated with the first slot and a second CPE associated with the second slot may be similar. For example, a last data symbol of the first slot may be associated with a first CPE, a first symbol of the second slot may be associated with a second CPE, and a difference between the first CPE and the second CPE may be less than a threshold.

In some examples, the second information may be a copy of the first information. For example, in the example first scenario of FIG. 10, the first symbol of the first slot may include a last data symbol (e.g., the last PSSCH symbol 1014) and the second symbol of the second slot may include an AGC symbol (e.g., the second AGC symbol 1022). In such examples, the second information of the second slot may be a copy of the first information of the first slot.

In some examples, the first information and the second information may include portions of the respective symbols. For example, in the example second scenario of FIG. 11, the first symbol of the first slot includes a last data symbol (e.g., the last PSSCH symbol 1112) and the second symbol of the second slot includes a first non-AGC symbol (e.g., the first non-AGC symbol 1122). In such examples, the second information may include a data portion of the second symbol (e.g., the PSSCH portion 1124), the first information may include a portion of the first symbol (e.g., the portion 1114), and the second information may be a copy of the first information.

In an example third scenario of FIG. 12, the first symbol of the first slot may include a last data symbol (e.g., the last PSSCH symbol 1212) and the second symbol of the second slot may include a first non-AGC symbol (e.g., the first non-AGC symbol 1222). In such examples, the second information may include a control portion of the second symbol (e.g., the PSCCH portion 1224), the first information may include a portion of the first symbol (e.g., portion 1214), and the first information may be a copy of the second information.

In an example fourth scenario of FIG. 13, the first symbol of the first slot may include a guard symbol (e.g., the guard symbol 1312) and the second symbol of the second slot may include a first non-AGC symbol (e.g., first non-AGC symbol 1322). In such examples, the second information may include a control portion of the second symbol (e.g., the PSCCH portion 1324), the first information may include a portion of the first symbol (e.g., the portion 1314), and the first information may be a copy of the second information.

Figure 19:
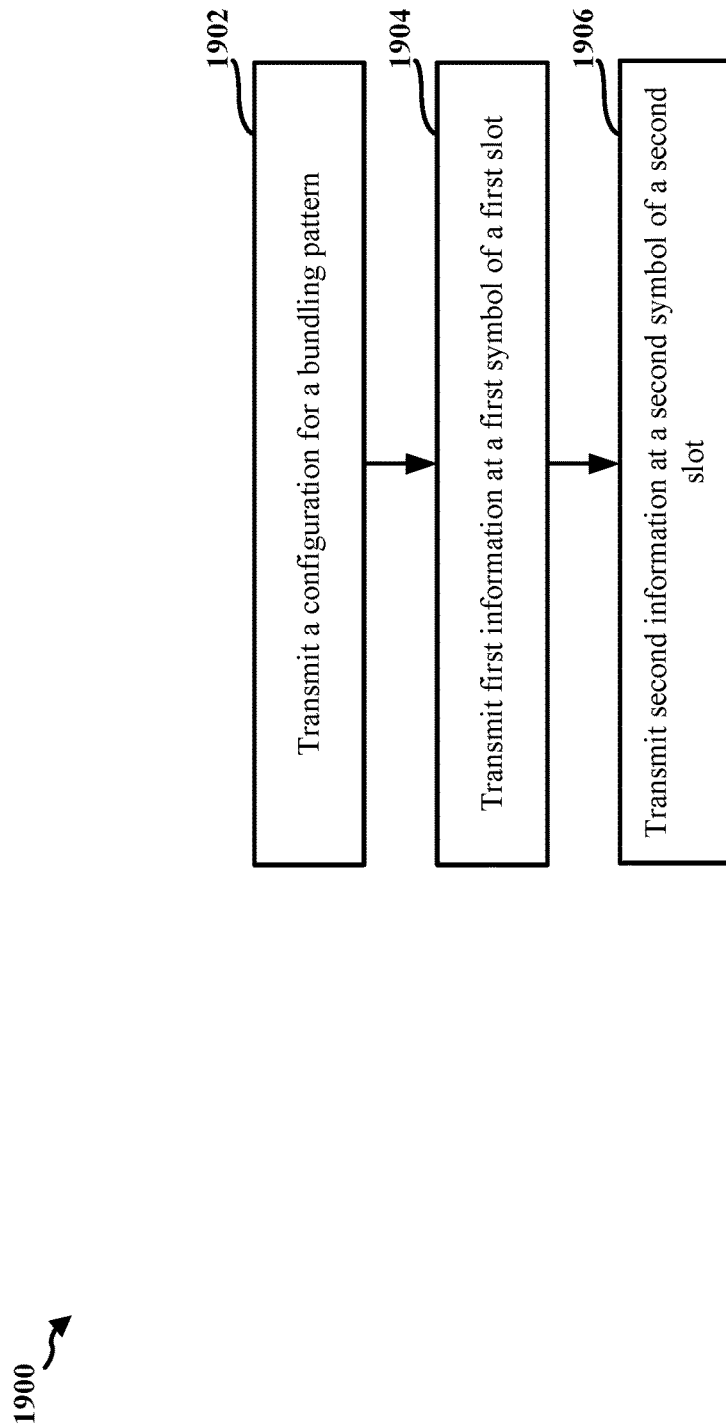
FIG. 19 is a flowchart of another method of wireless communication at a second wireless device, in accordance with aspects presented herein.

FIG. 19 is a flowchart 1900 of a method of wireless communication with a first wireless device. The method may be performed by a second wireless device (e.g., the UE 104, the first wireless communication device 310, and/or an apparatus 2002 of FIG. 20). The method may facilitate improving throughput by enabling the first wireless device to improve channel estimation and to communicate with the second wireless device using a high MCS.

In some examples, the first wireless device may include a first sidelink device and the second wireless device may include a second sidelink device. In some examples, the first wireless device may include a base station and the second wireless device may include a UE. In some examples, the first wireless device may include a UE and the second wireless device may include a base station.

At 1904, the second wireless device transmits, to the first wireless device, first information at a first symbol of a first slot, the first slot including at least the first symbol and a first reference signal, as described in connection with the first slot 1420 of FIG. 14. The transmitting of the first slot, at 1904, may be performed by a first slot component 2040 of the apparatus 2002 of FIG. 20.

At 1906, the second wireless device transmits second information at a second symbol of a second slot, the second slot including at least the second symbol and a second reference signal, the first information and the second information being repetitions, as described in connection with the second slot 1422 of FIG. 14. The transmitting of the second slot, at 1906, may be performed by a second slot component 2042 of the apparatus 2002 of FIG. 20.

In some examples, the first slot and the second slot may be separated by a threshold quantity of slots. For example, the first slot and the second slot may be included in a bundling window, such as the example sidelink DMRS bundling window 600 of FIG. 6. In some examples, the threshold quantity of slots may be zero. In such examples, the first slot and the second slot may be consecutive slots. In some examples, the threshold quantity of slots may be greater than zero. In such examples, the first slot and the second slot may be non-consecutive slots.

In some examples, a first CPE associated with the first slot and a second CPE associated with the second slot may be similar. For example, a last data symbol of the first slot may be associated with a first CPE, a first symbol of the second slot may be associated with a second CPE, and a difference between the first CPE and the second CPE may be less than a threshold.

In some examples, the second wireless device may configure the first wireless device to determine the symbols to combine to use for the channel estimation. For example, at 1902, the second wireless device may transmit a configuration indicating the first symbol and the second symbol, as described in connection with the configuration 1412 of FIG. 14. The configuration may include a pattern indicating the first symbol of the first slot and the second symbol of the second slot. The transmitting of the configuration, at 1902, may be performed by a configuration component 2044 of the apparatus 2002 of FIG. 20.

In some examples, the second information may be a copy of the first information. For example, in the example first scenario of FIG. 10, the first symbol of the first slot may include a last data symbol (e.g., the last PSSCH symbol 1014) and the second symbol of the second slot may include an AGC symbol (e.g., the second AGC symbol 1022). In such examples, the second information of the second slot may be a copy of the first information of the first slot.

In some examples, the first information and the second information may include portions of the respective symbols. For example, in the example second scenario of FIG. 11, the first symbol of the first slot includes a last data symbol (e.g., the last PSSCH symbol 1112) and the second symbol of the second slot includes a first non-AGC symbol (e.g., the first non-AGC symbol 1122). In such examples, the second information may include a data portion of the second symbol (e.g., the PSSCH portion 1124), the first information may include a portion of the first symbol (e.g., the portion 1114), and the second information may be a copy of the first information.

In an example third scenario of FIG. 12, the first symbol of the first slot may include a last data symbol (e.g., the last PSSCH symbol 1212) and the second symbol of the second slot may include a first non-AGC symbol (e.g., the first non-AGC symbol 1222). In such examples, the second information may include a control portion of the second symbol (e.g., the PSCCH portion 1224), the first information may include a portion of the first symbol (e.g., portion 1214), and the first information may be a copy of the second information.

In an example fourth scenario of FIG. 13, the first symbol of the first slot may include a guard symbol (e.g., the guard symbol 1312) and the second symbol of the second slot may include a first non-AGC symbol (e.g., first non-AGC symbol 1322). In such examples, the second information may include a control portion of the second symbol (e.g., the PSCCH portion 1324), the first information may include a portion of the first symbol (e.g., the portion 1314), and the first information may be a copy of the second information.

Figure 20:
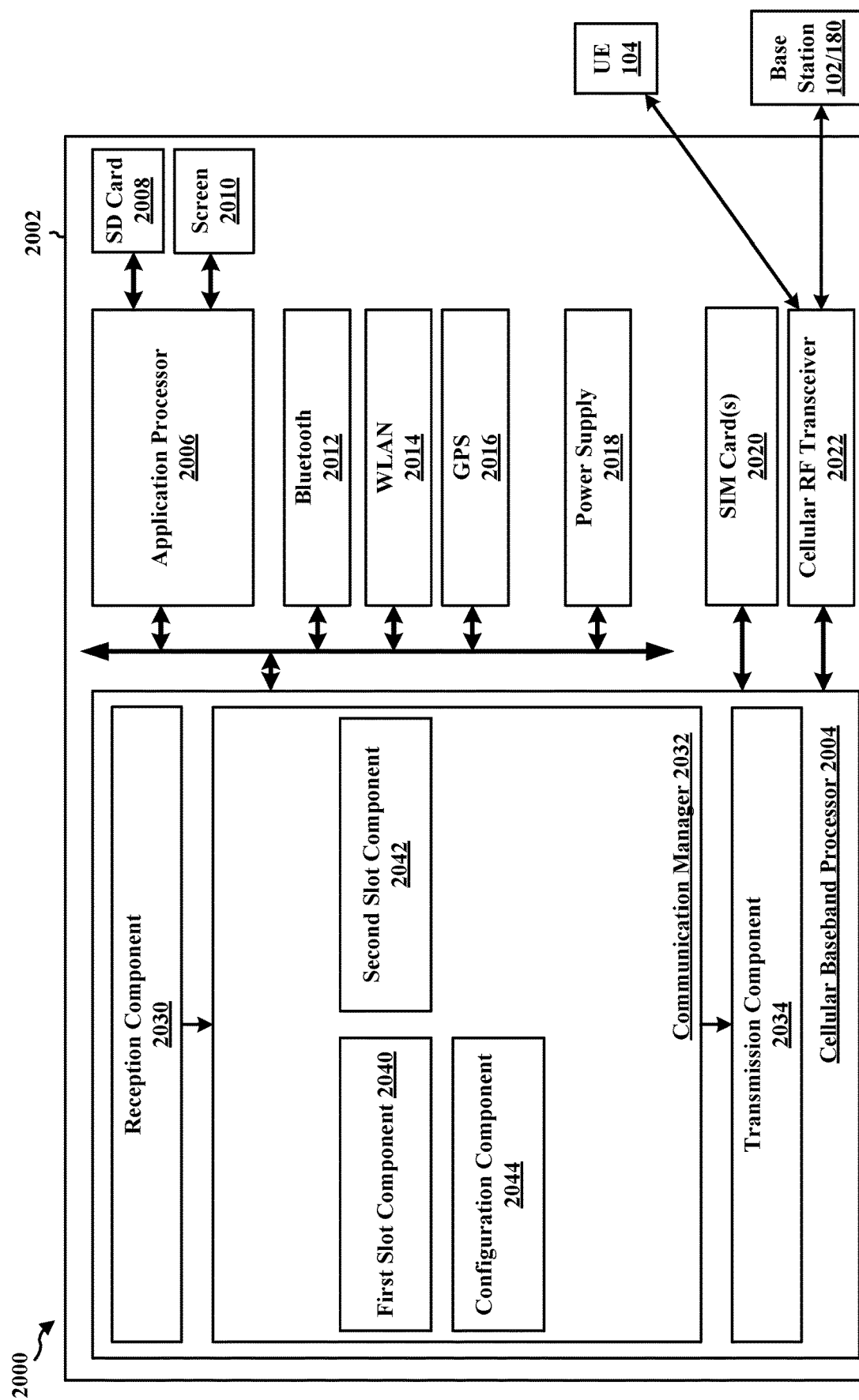
FIG. 20 is a diagram illustrating an example of a hardware implementation for an example apparatus.

FIG. 20 is a diagram 2000 illustrating an example of a hardware implementation for an apparatus 2002. The apparatus 2002 may be a UE, or another device configured to transmit and/or receive sidelink communication. The apparatus 2002 includes a baseband processor 2004 (also referred to as a modem) coupled to a RF transceiver 2022. In some aspects, the baseband processor 2004 may be a cellular baseband processor and/or the RF transceiver 2022 may be a cellular RF transceiver. The apparatus 2002 may further include one or more subscriber identity modules (SIM) cards 2020, an application processor 2006 coupled to a secure digital (SD) card 2008 and a screen 2010, a Bluetooth module 2012, a wireless local area network (WLAN) module 2014, a Global Positioning System (GPS) module 2016, and/or a power supply 2018. The baseband processor 2004 communicates through the RF transceiver 2022 with the UE 104 and/or the base station 102/180. The baseband processor 2004 may include a computer-readable medium/memory. The computer-readable medium/memory may be non-transitory. The baseband processor 2004 is responsible for general processing, including the execution of software stored on the computer-readable medium/memory. The software, when executed by the baseband processor 2004, causes the baseband processor 2004 to perform the various functions described in the present application. The computer-readable medium/memory may also be used for storing data that is manipulated by the baseband processor 2004 when executing software. The baseband processor 2004 further includes a reception component 2030, a communication manager 2032, and a transmission component 2034. The communication manager 2032 includes the one or more illustrated components. The components within the communication manager 2032 may be stored in the computer-readable medium/memory and/or configured as hardware within the baseband processor 2004. The baseband processor 2004 may be a component of the first wireless communication device 310 and may include the memory 360 and/or at least one of the TX processor 368, the RX processor 356, and the controller/processor 359. In one configuration, the apparatus 2002 may be a modem chip and include just the baseband processor 2004, and in another configuration, the apparatus 2002 may be the entire UE (e.g., see the first wireless communication device 310 of FIG. 3) and include the additional modules of the apparatus 2002.

The communication manager 2032 includes a first slot component 2040 that is configured to transmit, to the first wireless device, first information at a first symbol of a first slot, the first slot including at least the first symbol and a first reference signal, for example, as described in connection with 1802 of FIGS. 18 and/or 1904 of FIG. 19.

The communication manager 2032 also includes a second slot component 2042 that is configured to transmit second information at a second symbol of a second slot, the second slot including at least the second symbol and a second reference signal, the first information and the second information being repetitions, for example, as described in connection with 1804 of FIGS. 18 and/or 1906 of FIG. 19.

The communication manager 2032 also includes a configuration component 2044 that is configured to transmit a configuration indicating the first symbol and the second symbol, for example, as described in connection with 1902 of FIG. 19.

The apparatus may include additional components that perform each of the blocks of the algorithm in the flowcharts of FIGS. 18 and/or 19. As such, each block in the flowcharts of FIGS. 18 and/or 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2002 may include a variety of components configured for various functions. In one configuration, the apparatus 2002, and in particular the baseband processor 2004, includes means for transmitting, to the first wireless device, first information at a first symbol of a first slot, the first slot including at least the first symbol and a first reference signal. The example apparatus 2002 also includes means for transmitting second information at a second symbol of a second slot, the second slot including at least the second symbol and a second reference signal, the first information and the second information being repetitions.

In another configuration, the example apparatus 2002 also includes means for transmitting a configuration indicating the first symbol and the second symbol.

The means may be one or more of the components of the apparatus 2002 configured to perform the functions recited by the means. As described supra, the apparatus 2002 may include the TX processor 368, the RX processor 356, and the controller/processor 359. As such, in one configuration, the means may be the TX processor 368, the RX processor 356, and the controller/processor 359 configured to perform the functions recited by the means.

The aspects presented herein may enable a first wireless device to estimate a phase jump between a first slot and a second slot, which may facilitate improving communication performance, for example, by improving channel estimation and increasing throughput.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first wireless device including at least one processor coupled to a memory, the memory and the at least one processor configured to receive, from a second wireless device, first information at a first symbol of a first slot, the first slot including at least the first symbol and a first reference signal; receive second information at a second symbol of a second slot, the second slot including at least the second symbol and a second reference signal, the first information and the second information being repetitions; generate a first reference signal copy based at least on the second reference signal and a phase jump between the first slot and the second slot, the phase jump based on a first phase error associated with the first symbol and a second phase error associated with the second symbol; and perform channel estimation across the first slot and the second slot based on an aggregation of the first reference signal and the first reference signal copy.

Aspect 2 is the apparatus of aspect 1, further including that the first slot and the second slot are separated by a threshold quantity of slots.

Aspect 3 is the apparatus of any of aspects 1 and 2, further including that the first symbol of the first slot is associated with a first CPE, the second symbol of the second slot is associated with a second CPE, and a difference between the first CPE and the second CPE is less than a threshold.

Aspect 4 is the apparatus of any of aspects 1 to 2, further including that the first slot and the second slot are non-consecutive slots.

Aspect 5 is the apparatus of any of aspects 1 to 2, further including that the first slot and the second slot are consecutive slots.

Aspect 6 is the apparatus of any of aspects 1 to 5, further including that the phase jump is based on a difference between the second phase error and the first phase error.

Aspect 7 is the apparatus of any of aspects 1 to 6, further including that the first symbol of the first slot includes a last data symbol, the second symbol of the second slot includes an automatic gain control symbol, and the second information is a copy of the first information.

Aspect 8 is the apparatus of any of aspects 1 to 6, further including that the first symbol of the first slot includes a last data symbol, the second symbol of the second slot includes a first non-automatic gain control symbol, and the second information is a copy of the first information, the second information including a data portion of the second symbol and the first information including a portion of the first symbol.

Aspect 9 is the apparatus of any of aspects 1 to 6, further including that the first symbol of the first slot includes a last data symbol, the second symbol of the second slot includes a first non-automatic gain control symbol, and the first information is a copy of the second information, the second information including a control portion of the second symbol and the first information including a portion of the first symbol.

Aspect 10 is the apparatus of any of aspects 1 to 6, further including that the first symbol of the first slot includes a guard symbol, the second symbol of the second slot includes a first non-automatic gain control symbol, and the first information is a copy of the second information, the second information including a control portion of the second symbol and the first information including a portion of the first symbol.

Aspect 11 is the apparatus of any of aspects 1 to 10, further including that the first wireless device comprises a base station and the second wireless device comprises a user equipment, or the first wireless device comprises the user equipment and the second wireless device comprises the base station.

Aspect 12 is the apparatus of any of aspects 1 to 10, further including that the first wireless device comprises a first sidelink device and the second wireless device comprises a second sidelink device.

Aspect 13 is the apparatus of any of aspects 1 to 12, further including a transceiver coupled to the at least one processor.

Aspect 14 is a method of wireless communication for implementing any of aspects 1 to 13.

Aspect 15 is an apparatus for wireless communication including means for implementing any of aspects 1 to 13.

Aspect 16 is a non-transitory computer-readable storage medium storing computer executable code, where the code, when executed, causes a processor to implement any of aspects 1 to 13.

Aspect 17 is an apparatus for wireless communication, with a first wireless device, at a second wireless device including at least one processor coupled to a memory, the memory and the at least one processor configured to transmit, to the first wireless device, first information at a first symbol of a first slot, the first slot including at least the first symbol and a first reference signal; and transmit second information at a second symbol of a second slot, the second slot including at least the second symbol and a second reference signal, the first information and the second information being repetitions.

Aspect 18 is the apparatus of aspect 17, further including that the first slot and the second slot are separated by a threshold quantity of slots.

Aspect 19 is the apparatus of any of aspects 17 and 18, further including that the first symbol of the first slot is associated with a first CPE, the second symbol of the second slot is associated with a second CPE, and a difference between the first CPE and the second CPE is less than a threshold.

Aspect 20 is the apparatus of any of aspects 17 to 18, further including that the first slot and the second slot are non-consecutive slots.

Aspect 21 is the apparatus of any of aspects 17 to 18, further including that the first slot and the second slot are consecutive slots.

Aspect 22 is the apparatus of any of aspects 17 to 21, further including that the first symbol of the first slot includes a last data symbol, the second symbol of the second slot includes an automatic gain control symbol, and the second information is a copy of the first information.

Aspect 23 is the apparatus of any of aspects 17 to 21, further including that the first symbol of the first slot includes a last data symbol, the second symbol of the second slot includes a first non-automatic gain control symbol, and the second information is a copy of the first information, the second information including a data portion of the second symbol and the first information including a portion of the first symbol.

Aspect 24 is the apparatus of any of aspects 17 to 21, further including that the first symbol of the first slot includes a last data symbol, the second symbol of the second slot includes a first non-automatic gain control symbol, and the first information is a copy of the second information, the second information including a control portion of the second symbol and the first information including a portion of the first symbol.

Aspect 25 is the apparatus of any of aspects 17 to 21, further including that the first symbol of the first slot includes a guard symbol, the second symbol of the second slot includes a first non-automatic gain control symbol, and the first information is a copy of the second information, the second information including a control portion of the second symbol and the first information including a portion of the first symbol.

Aspect 26 is the apparatus of any of aspects 17 to 25, further including that the memory and the at least one processor are further configured to: transmit a configuration indicating the first symbol and the second symbol.

Aspect 27 is the apparatus of any of aspects 17 to 26, further including that the first wireless device comprises a base station and the second wireless device comprises a user equipment, or the first wireless device comprises the user equipment and the second wireless device comprises the base station.

Aspect 28 is the apparatus of any of aspects 17 to 26, further including that the first wireless device comprises a first sidelink device and the second wireless device comprises a second sidelink device.

Aspect 29 is the apparatus of any of aspects 17 to 28, further including a transceiver coupled to the at least one processor.

Aspect 30 is a method of wireless communication for implementing any of aspects 17 to 29.

Aspect 31 is an apparatus for wireless communication including means for implementing any of aspects 17 to 29.

Aspect 32 is a non-transitory computer-readable storage medium storing computer executable code, where the code, when executed, causes a processor to implement any of aspects 17 to 29.

What is claimed is:

1. An apparatus for wireless communication at a first wireless device, comprising:
a memory; and
at least one processor coupled to the memory, the at least one processor configured to:
receive, from a second wireless device, first information at a first symbol of a first slot, the first slot including at least the first symbol and a first reference signal;
receive second information at a second symbol of a second slot, the second slot including at least the second symbol and a second reference signal, the first information and the second information being repetitions;
generate a first reference signal copy based at least on the second reference signal and a phase jump between the first slot and the second slot, the phase jump based on a first phase error associated with the first symbol and a second phase error associated with the second symbol; and
perform channel estimation across the first slot and the second slot based on an aggregation of the first reference signal and the first reference signal copy.

2. The apparatus of claim 1, wherein the first slot and the second slot are separated by a threshold quantity of slots.

3. The apparatus of claim 2, wherein the first slot and the second slot are non-consecutive slots.

4. The apparatus of claim 2, wherein the first slot and the second slot are consecutive slots.

5. The apparatus of claim 2, wherein the phase jump is based on a difference between the second phase error and the first phase error.

6. The apparatus of claim 1, wherein
the first symbol of the first slot includes a last data symbol,
the second symbol of the second slot includes an automatic gain control symbol, and
the second information is a copy of the first information.

7. The apparatus of claim 1, wherein
the first symbol of the first slot includes a last data symbol,
the second symbol of the second slot includes a first non-automatic gain control symbol, and
the second information is a copy of the first information, the second information including a data portion of the second symbol and the first information including a portion of the first symbol.

8. The apparatus of claim 1, wherein
the first symbol of the first slot includes a last data symbol,
the second symbol of the second slot includes a first non-automatic gain control symbol, and
the first information is a copy of the second information, the second information including a control portion of the second symbol and the first information including a portion of the first symbol.

9. The apparatus of claim 1, wherein
the first symbol of the first slot includes a guard symbol,
the second symbol of the second slot includes a first non-automatic gain control symbol, and
the first information is a copy of the second information, the second information including a control portion of the second symbol and the first information including a portion of the first symbol.

10. The apparatus of claim 1, wherein the first wireless device comprises a base station and the second wireless device comprises a user equipment, or the first wireless device comprises the user equipment and the second wireless device comprises the base station.

11. The apparatus of claim 1, wherein the first wireless device comprises a first sidelink device and the second wireless device comprises a second sidelink device.

12. The apparatus of claim 1, further comprising a transceiver coupled to the at least one processor.

13. A method of wireless communication at a first wireless device, comprising:
receiving, from a second wireless device, first information at a first symbol of a first slot, the first slot including at least the first symbol and a first reference signal;
receiving second information at a second symbol of a second slot, the second slot including at least the second symbol and a second reference signal, the first information and the second information being repetitions;
estimating a phase jump between the first slot and the second slot, the phase jump based on a first phase error associated with the first symbol and a second phase error associated with the second symbol; and
performing channel estimation across the first slot and the second slot based in part on the phase jump.

14. The method of claim 13, wherein
the first symbol of the first slot includes a last data symbol,
the second symbol of the second slot includes an automatic gain control symbol, and
the second information is a copy of the first information.

15. The method of claim 13, wherein
the first symbol of the first slot includes a last data symbol,
the second symbol of the second slot includes a first non-automatic gain control symbol, and
the second information is a copy of the first information, the second information including a data portion of the second symbol and the first information including a portion of the first symbol.

16. The method of claim 13, wherein
the first symbol of the first slot includes a last data symbol,
the second symbol of the second slot includes a first non-automatic gain control symbol, and
the first information is a copy of the second information, the second information including a control portion of the second symbol and the first information including a portion of the first symbol.

17. The method of claim 13, wherein
the first symbol of the first slot includes a guard symbol,
the second symbol of the second slot includes a first non-automatic gain control symbol, and
the first information is a copy of the second information, the second information including a control portion of the second symbol and the first information including a portion of the first symbol.

18. The method of claim 13, further comprising:
generating a first reference signal copy based at least on the second reference signal and the phase jump; and
performing the channel estimation across the first slot and the second slot based on an aggregation of the first reference signal and the first reference signal copy.

19. An apparatus for wireless communication at a first wireless device, comprising:
a memory; and
at least one processor coupled to the memory, the at least one processor configured to:
receive, from a second wireless device, first information at a first symbol of a first slot, the first slot including at least the first symbol and a first reference signal;
receive second information at a second symbol of a second slot, the second slot including at least the second symbol and a second reference signal, the first information and the second information being repetitions;
estimate a phase jump between the first slot and the second slot, the phase jump based on a first phase error associated with the first symbol and a second phase error associated with the second symbol; and
perform channel estimation across the first slot and the second slot based in part on the phase jump.

20. The apparatus of claim 19, wherein
the first symbol of the first slot includes a last data symbol,
the second symbol of the second slot includes an automatic gain control symbol, and
the second information is a copy of the first information.

21. The apparatus of claim 19, wherein
the first symbol of the first slot includes a last data symbol,
the second symbol of the second slot includes a first non-automatic gain control symbol, and
the second information is a copy of the first information, the second information including a data portion of the second symbol and the first information including a portion of the first symbol.

22. The apparatus of claim 19, wherein
the first symbol of the first slot includes a last data symbol,
the second symbol of the second slot includes a first non-automatic gain control symbol, and
the first information is a copy of the second information, the second information including a control portion of the second symbol and the first information including a portion of the first symbol.

23. The apparatus of claim 19, wherein
the first symbol of the first slot includes a guard symbol,
the second symbol of the second slot includes a first non-automatic gain control symbol, and
the first information is a copy of the second information, the second information including a control portion of the second symbol and the first information including a portion of the first symbol.

24. The apparatus of claim 19, wherein the at least one processor is further configured to:
generate a first reference signal copy based at least on the second reference signal and the phase jump; and
perform the channel estimation across the first slot and the second slot based on an aggregation of the first reference signal and the first reference signal copy.

25. A non-transitory computer-readable storage medium comprising computer-executable code at a first wireless device, the computer-executable code, when executed, causes a processor to:
receive, from a second wireless device, first information at a first symbol of a first slot, the first slot including at least the first symbol and a first reference signal;
receive second information at a second symbol of a second slot, the second slot including at least the second symbol and a second reference signal, the first information and the second information being repetitions;
estimate a phase jump between the first slot and the second slot, the phase jump based on a first phase error associated with the first symbol and a second phase error associated with the second symbol; and
perform channel estimation across the first slot and the second slot based in part on the phase jump.

26. The non-transitory computer-readable storage medium of claim 25, wherein
the first symbol of the first slot includes a last data symbol,
the second symbol of the second slot includes an automatic gain control symbol, and
the second information is a copy of the first information.

27. The non-transitory computer-readable storage medium of claim 25, wherein
the first symbol of the first slot includes a last data symbol,
the second symbol of the second slot includes a first non-automatic gain control symbol, and
the second information is a copy of the first information, the second information including a data portion of the second symbol and the first information including a portion of the first symbol.

28. The non-transitory computer-readable storage medium of claim 25, wherein
the first symbol of the first slot includes a last data symbol,
the second symbol of the second slot includes a first non-automatic gain control symbol, and
the first information is a copy of the second information, the second information including a control portion of the second symbol and the first information including a portion of the first symbol.

29. The non-transitory computer-readable storage medium of claim 25, wherein
the first symbol of the first slot includes a guard symbol,
the second symbol of the second slot includes a first non-automatic gain control symbol, and
the first information is a copy of the second information, the second information including a control portion of the second symbol and the first information including a portion of the first symbol.

30. The non-transitory computer-readable storage medium of claim 25, the computer-executable code, when executed, further causes the processor to:
generate a first reference signal copy based at least on the second reference signal and the phase jump; and
perform the channel estimation across the first slot and the second slot based on an aggregation of the first reference signal and the first reference signal copy.

* * * * *